US012674410B2

(12) United States Patent
Bemment et al.

(10) Patent No.: US 12,674,410 B2
(45) Date of Patent: Jul. 7, 2026

(54) COMPRESSION IN A GAS TURBINE ENGINE

(71) Applicant: ROLLS-ROYCE plc, London (GB)

(72) Inventors: Craig W Bemment, Derby (GB); Pascal Dunning, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 19/173,271

(22) Filed: Apr. 8, 2025

(65) Prior Publication Data

US 2025/0237168 A1 Jul. 24, 2025

Related U.S. Application Data

(63) Continuation of application No. 18/405,485, filed on Jan. 5, 2024, now Pat. No. 12,297,770, which is a continuation of application No. 18/123,091, filed on Mar. 17, 2023, now Pat. No. 11,898,489, which is a continuation of application No. 17/697,630, filed on Mar. 17, 2022, now Pat. No. 11,635,021, which is a continuation of application No. 17/345,588, filed on Jun. 11, 2021, now Pat. No. 11,326,512, which is a continuation of application No. 16/558,417, filed on Sep. 3, 2019, now Pat. No. 11,053,842.

(30) Foreign Application Priority Data

Jun. 24, 2019 (GB) ...................................... 1908972

(51) Int. Cl.
| | |
|---|---|
| *F02C 3/04* | (2006.01) |
| *F02C 7/36* | (2006.01) |
| *F02K 3/06* | (2006.01) |

(52) U.S. Cl.
CPC .................. *F02C 3/04* (2013.01); *F02C 7/36* (2013.01); *F02K 3/06* (2013.01); *F05D 2200/14* (2013.01); *F05D 2220/323* (2013.01); *F05D 2220/36* (2013.01); *F05D 2240/307* (2013.01); *F05D 2260/4031* (2013.01)

(58) Field of Classification Search
None
See application file for complete search history.

(56) References Cited

U.S. PATENT DOCUMENTS

| | | | | |
|---|---|---|---|---|
| 2015/0308353 | A1* | 10/2015 | Gardner | ................... F02C 7/36 60/773 |
| 2016/0265430 | A1* | 9/2016 | Schwarz | ................. F02C 3/107 |
| 2016/0363047 | A1* | 12/2016 | Schwarz | .................. F01D 5/14 |
| 2018/0327109 | A1* | 11/2018 | Coat | ......................... F02K 3/06 |

* cited by examiner

*Primary Examiner* — Shafiq Mian
(74) *Attorney, Agent, or Firm* — Oliff PLC

(57) ABSTRACT

A gas turbine engine for an aircraft comprises an engine core comprising a turbine, a compressor, and a core shaft connecting the turbine to the compressor, wherein a compressor exit temperature is defined as an average temperature of airflow at the exit from the compressor; and a fan located upstream of the engine core, the fan comprising a plurality of fan blades extending from a hub, each fan blade having a leading edge and a trailing edge, wherein a fan rotor entry temperature is defined as an average temperature of airflow across the leading edge of each fan blade at cruise conditions and a fan tip rotor exit temperature is defined as an average temperature of airflow across a radially outer portion of each fan blade at the trailing edge at cruise conditions. A core to fan tip temperature rise ratio is in the range from 2.845 to 3.8.

20 Claims, 6 Drawing Sheets

1

COMPRESSION IN A GAS TURBINE ENGINE

CROSS-REFERENCE TO RELATED APPLICATION(S)

This application is a continuation of U.S. application Ser. No. 18/405,485 filed Jan. 5, 2024, which is a continuation of U.S. application Ser. No. 18/123,091 filed Mar. 17, 2023, which is a continuation of U.S. application Ser. No. 17/697, 630 filed Mar. 17, 2022, which is a continuation of U.S. application Ser. No. 17/345,588 filed Jun. 11, 2021, which is a continuation of U.S. application Ser. No. 16/558,417 filed Sep. 3, 2019, which is based on and claims priority under 35 U.S.C. 119 from Great Britain Application No. 1908972.1 filed on Jun. 24, 2019. The entire contents of the above applications are incorporated herein by reference.

The present disclosure relates to a gas turbine engine for an aircraft, and more specifically to a gas turbine engine arranged to have specified relative airflow temperatures at different locations when operating at cruise conditions.

Gas turbine engines for aircraft propulsion have many design factors that affect the overall efficiency and power output or thrust. A general aim for a gas turbine engine is to provide thrust with low specific fuel consumption (SFC). In order to reduce SFC during cruise conditions both the thermal and propulsive efficiencies of the engine may be increased.

To enable a higher thrust at a high efficiency, a larger diameter fan may be used. When making a larger engine however, simply scaling up components of a known engine type may not provide a corresponding scaling of power/thrust and/or efficiency, for example due to differences in heat transfer throughout the larger engine. Reconsideration of engine parameters and operating conditions may therefore be appropriate in order to provide a low SFC.

As used herein, a range "from value X to value Y" or "between value X and value Y", or the likes, denotes an inclusive range; including the bounding values of X and Y. All temperatures and pressure referred to herein are total temperature or total pressure unless otherwise stated. Where an average temperature is referred to this is taken to be a mean value. All temperatures are in Kelvin unless otherwise stated.

According to a first aspect there is provided a gas turbine engine for an aircraft comprising: an engine core comprising a turbine, a compressor, a core shaft connecting the turbine to the compressor, and an annular splitter at which the flow is divided between a core flow that flows through the engine core, and a bypass flow that flows along a bypass duct, wherein stagnation streamlines around the circumference of the engine, stagnating on a leading edge of the annular splitter, form a streamsurface forming a radially inner boundary of a streamtube that contains all of the bypass flow; and a fan located upstream of the engine core, the fan comprising a plurality of fan blades extending from a hub, each fan blade having a leading edge and a trailing edge, wherein a fan tip radius of the fan is defined between a centreline of the engine and an outermost tip of each fan blade at its leading edge and a hub radius is defined between and the centreline of the engine and an outer surface of the hub at the radial position of the leading edge of each fan blade, each fan blade having a radially outer portion lying within the streamtube that contains the bypass flow. A fan rotor entry temperature is defined as an average temperature of airflow across the leading edge of each fan blade at cruise conditions and a fan rotor exit temperature is defined as an average temperature of airflow across a radially outer portion of each fan blade at the trailing edge at cruise conditions. A fan hub to tip ratio of:

$$\frac{\text{the fan hub radius}}{\text{the fan tip radius}}$$

is in the range from 0.2 to 0.285; and a fan tip temperature rise of:

$$\frac{\text{the fan tip rotor exit temperature}}{\text{the fan rotor entry temperature}}$$

is in the range from 1.11 to 1.05.

According to a second aspect, there is provided a gas turbine engine for an aircraft comprising: an engine core comprising a turbine, a compressor, and a core shaft connecting the turbine to the compressor, wherein the engine core has a core radius defined between the centreline of the engine and a forwardmost tip of the engine core; and a fan located upstream of the engine core, the fan comprising a plurality of fan blades extending from a hub, each fan blade having a leading edge and a trailing edge, wherein a fan tip radius of the fan is defined between a centreline of the engine and an outermost tip of each fan blade at its leading edge and a hub radius is defined between and the centreline of the engine and an outer surface of the hub at the radial position of the leading edge of each fan blade. A fan rotor entry temperature is defined as an average temperature of airflow across the leading edge of each fan blade at cruise conditions and a fan tip rotor exit temperature is defined as an average temperature of airflow across a radially outer portion of each fan blade at the trailing edge at cruise conditions, wherein the radially outer portion of each fan blade is or comprises the portion of each fan blade at a distance from the centreline of the engine greater than the core radius. A fan hub to tip ratio of:

$$\frac{\text{the fan hub radius}}{\text{the fan tip radius}}$$

is in the range from 0.2 to 0.285; and a fan tip temperature rise of:

$$\frac{\text{the fan tip rotor exit temperature}}{\text{the fan rotor entry temperature}}$$

is in the range from 1.11 to 1.05.

To achieve a high propulsive efficiency without compromising transfer efficiency (how efficiently energy is transferred from the core stream to the bypass stream), the inventors appreciated that there should be a relatively low fan (and more specifically, fan tip) temperature rise. A relatively low fan temperature rise may indicate that the fan is capable of high efficiency in terms of useful work done by the fan, in particular avoiding energy wastage as temperature rise across the fan relative to ideal isentropic compression. To achieve this high propulsive efficiency, reducing fuel burn, a high-flow fan is desired; the fan is therefore arranged to have a low hub to tip ratio to increase or maximise fan flow area for a given diameter.

An efficient aerodynamic fan design may therefore be provided to allow a relatively low hub to tip ratio and a relatively low fan temperature rise—an engine cycle is selected to facilitate the fan temperature rise remaining within the specified range at cruise conditions. An efficient aerodynamic fan design may comprise, for example, one or more of (i) a relatively wide chord with a relatively long sweep, (ii) relatively low suction surface curvature, and (iii) a relatively low friction surface.

The skilled person would appreciate that specific fuel consumption (SFC), weight and drag combine to give "fuel burn" of an installed engine. Reducing the fan tip temperature rise below the range specified above may require the use of an excessively large fan in order to achieve a required thrust level, resulting in undesirable increased weight and installation constraints and potentially negating any SFC fuel burn benefits in the overall fuel burn of the engine when installed on an aircraft.

Reducing the hub to tip ratio below the range specified above may deleteriously reduce fan strength. The skilled person would appreciate that the fan root and disc are designed to be strong enough to support the fan blade tips under all loads likely to be experienced in operation.

As compared to prior art engine designs, the engine as described herein may allow for one or more of reduced fuel burn, reduced noise, and reduced specific fuel consumption (SFC). The low hub to tip ratio, coupled with the low fan tip temperature rise, has been found to provide a fuel burn efficiency improvement in various embodiments.

The fan hub to tip ratio may be in the range from 0.200 to 0.285, and optionally in the range from 0.24 to 0.27.

The fan tip temperature rise may be equal to 1.1, and optionally equal to 1.11.

The gas turbine engine may further comprise a nacelle surrounding the fan and the engine core and defining a bypass duct outside of the engine core. The fan tip rotor exit temperature and the fan rotor entry temperature may each provide a temperature of airflow across the fan blade portion in a bypass stream of air about to enter the bypass duct. The radially outer portion of each fan blade may be, comprise, or form a major part of the portion of each fan blade extending across the entrance to the bypass duct.

A high propulsive efficiency may be achieved by having a low specific thrust engine with a low fan pressure ratio. For example, a fan pressure ratio is defined as the ratio of the mean total pressure of the air flow at the exit of the fan to the mean total pressure of the air flow at the inlet of the fan, and wherein, at cruise conditions:

the fan pressure ratio may be in a range between 1.2 and 1.45, and optionally the fan pressure ratio may be in a range between 1.35 and 1.43, and further optionally the fan pressure ratio may be 1.39.

The turbine may be a first turbine, the compressor a first compressor, and the core shaft a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

The Overall Pressure Ratio (OPR) at cruise may be greater than 40 and lower than 80, and optionally in the range from 45 to 55.

According to a third aspect there is provided a method of operating a gas turbine engine on an aircraft, the gas turbine engine being as defined in either of the preceding two aspects, wherein the method comprises operating the gas turbine engine to provide propulsion under cruise conditions such that the fan hub to tip ratio is in the range from 0.2 to 0.285, and the fan tip temperature rise is in the range from 1.11 to 1.05.

According to a fourth aspect there is provided a gas turbine engine for an aircraft comprising: an engine core comprising a turbine, a compressor, and a core shaft connecting the turbine to the compressor, wherein a compressor exit temperature is defined as an average temperature of airflow at the exit from the compressor, the engine core further comprising an annular splitter at which the flow is divided between a core flow that flows through the engine core, and a bypass flow that flows along a bypass duct and a fan located upstream of the engine core, the fan comprising a plurality of fan blades extending from a hub, each fan blade having a leading edge and a trailing edge. Stagnation streamlines around the circumference of the engine, stagnating on a leading edge of the annular splitter, form a streamsurface forming a radially inner boundary of a streamtube that contains all of the bypass flow. Each fan has a radially outer portion lying within the streamtube that contains the bypass flow. A fan rotor entry temperature is defined as an average temperature of airflow across the leading edge of each fan blade at cruise conditions and a fan tip rotor exit temperature is defined as an average temperature of airflow across a radially outer portion of each fan blade at the trailing edge at cruise conditions. A fan tip temperature rise is defined as:

$$\frac{\text{the fan tip rotor exit temperature}}{\text{the fan rotor entry temperature}}.$$

A core temperature rise is defined as:

$$\frac{\text{the compressor exit temperature}}{\text{the fan rotor entry temperature}}.$$

A core to fan tip temperature rise ratio of:

$$\frac{\text{the core temperature rise}}{\text{the fan tip temprature rise}}$$

is in the range from 2.845 to 3.8.

According to a fifth aspect there is provided a gas turbine engine for an aircraft comprising: an engine core comprising a turbine, a compressor, and a core shaft connecting the turbine to the compressor, wherein a compressor exit temperature is defined as an average temperature of airflow at the exit from the compressor, the engine core having a core radius defined between the centreline of the engine and a forwardmost tip of the engine core; and a fan located upstream of the engine core, the fan comprising a plurality of fan blades extending from a hub, each fan blade having a leading edge and a trailing edge. A radially outer portion of each fan blade is or comprises the portion of each fan blade at a distance from the centreline of the engine greater than the core radius. A fan rotor entry temperature is defined as an average temperature of airflow across the leading edge of each fan blade at cruise conditions and a fan tip rotor exit temperature is defined as an average temperature of airflow across a radially outer portion of each fan blade at the trailing edge at cruise conditions. A fan tip temperature rise is defined as:

$$\frac{\text{the fan tip rotor exit temperature}}{\text{the fan rotor entry temperature}}.$$

A core temperature rise is defined as:

$$\frac{\text{the compressor exit temperature}}{\text{the fan rotor entry temperature}}.$$

A core to fan tip temperature rise ratio of:

$$\frac{\text{the core temperature rise}}{\text{the fan } \textit{tiptemperature} \text{ rise}}$$

is in the range from 2.845 to 3.8.

The skilled person would appreciate that a high propulsive efficiency may be achieved by having a low specific thrust engine with a low fan pressure ratio. To do this without compromising transfer efficiency there should be a low fan tip temperature rise, which reduces energy wastage as temperature rise across the fan relative to ideal isentropic compression. To facilitate achieving low fuel burn, the gas turbine engine may require high thermal efficiency—this may be achieved by efficient core compression which is achieved by a high core temperature rise.

The core to fan tip temperature rise ratio is therefore relatively high by virtue of the relatively high core temperature rise and relatively low fan tip temperature rise. The engine cycle may be devised based on these parameters.

Reducing the fan tip temperature rise below the range specified above may require the use of an excessively large fan, potentially resulting in undesirable increased weight and installation constraints and negating any fuel burn benefits.

Increasing the core temperature rise beyond the range specified above may overheat engine materials, potentially weakening or damaging the engine, and/or may require more cooling air so reducing or negating any efficiency benefit.

As compared to known engine designs, the engine as described herein may allow for one or more of reduced fuel burn, reduced noise, and/or reduced specific fuel consumption. The combination of a high level of core temperature rise and a low fan tip temperature rise may provide an improvement in fuel burn efficiency by combining increased thermal efficiency and propulsive efficiency.

The core to fan tip temperature rise ratio may be in the range from 2.845 to 3.800, and optionally in the range from 2.9 to 3.2.

The fan tip temperature rise may be in the range from 1.05 to 1.11.

The core temperature rise may be in the range from 3.1 to 4.0, and optionally in the range from 3.3 to 3.5.

The engine may further comprise a nacelle surrounding the fan and the engine core and defining a bypass duct outside of the engine core. The fan tip rotor exit temperature and the fan rotor entry temperature may each provide a temperature of airflow across the fan blade portion in a bypass stream of air about to enter the bypass duct. The radially outer portion of each fan blade may be, comprise, or form a major part of the portion of each fan blade extending across the entrance to the bypass duct.

The engine may comprise more than one compressor. In such embodiments, the compressor exit temperature may be measured or defined at the exit from the highest pressure compressor.

The Overall Pressure Ratio (OPR) at cruise may be greater than 40 and lower than 80, and optionally in the range from 45 to 55.

The turbine may be a first turbine, the compressor a first compressor, and the core shaft a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

According to a sixth aspect, there is provided a method of operating a gas turbine engine on an aircraft, the gas turbine engine being as defined in either of the preceding two aspects, wherein the method comprises operating the gas turbine engine to provide propulsion under cruise conditions such that the core to fan tip temperature rise ratio is in the range from 2.845 to 3.8.

According to a seventh aspect there is provided a gas turbine engine for an aircraft comprising an engine core comprising a turbine, a compressor, and a core shaft connecting the turbine to the compressor, and a fan located upstream of the engine core, the fan comprising a plurality of fan blades extending from a hub, each fan blade having a leading edge and a trailing edge. A compressor exit temperature is defined as an average temperature of airflow at the exit from the compressor at cruise conditions and a core entry temperature is defined as an average temperature of airflow entering the engine core at cruise conditions, and a core compressor temperature rise is defined as:

$$\frac{\text{the compressor exit temperature}}{\text{the core entry temperature}}.$$

The engine core further comprises an annular splitter at which the flow is divided between a core flow that flows through the engine core, and a bypass flow that flows along a bypass duct. Stagnation streamlines around the circumference of the engine, stagnating on a leading edge of the annular splitter, form a streamsurface forming a radially inner boundary of a streamtube that contains all of the bypass flow. Each fan blade has a radially outer portion lying within the streamtube that contains the bypass flow. A fan rotor entry temperature is defined as an average temperature of airflow across the leading edge of each fan blade at cruise conditions and a fan tip rotor exit temperature is defined as an average temperature of airflow across the radially outer portion of each fan blade at the trailing edge at cruise conditions. A fan tip temperature rise is defined as:

$$\frac{\text{the fan tip rotor exit temperature}}{\text{the fan rotor entry temperature}}.$$

A core compressor to fan tip temperature rise ratio of:

$$\frac{\text{the core compressor temperature rise}}{\text{the fan temperature rise}}$$

is in the range from 2.67 to 3.8.

According to an eighth aspect, there is provided a gas turbine engine for an aircraft comprising an engine core having a core radius defined between the centreline of the engine and a forwardmost tip of the engine core, wherein the engine core comprises a turbine, a compressor, and a core shaft connecting the turbine to the compressor, the engine further comprising a fan located upstream of the engine core, the fan comprising a plurality of fan blades extending from a hub, each fan blade having a leading edge and a trailing edge, wherein a radially outer portion of each fan blade is or comprises the portion of each fan blade at a distance from the centreline of the engine greater than the core radius. A compressor exit temperature is defined as an average temperature of airflow at the exit from the compressor at cruise conditions and a core entry temperature is defined as an average temperature of airflow entering the engine core at cruise conditions, and a core compressor temperature rise is defined as:

$$\frac{\text{the compressor exit temperature}}{\text{the core entry temperature}}.$$

A fan rotor entry temperature is defined as an average temperature of airflow across the leading edge of each fan blade at cruise conditions and a fan tip rotor exit temperature is defined as an average temperature of airflow across the radially outer portion of each fan blade at the trailing edge at cruise conditions and a fan tip temperature rise is defined as:

$$\frac{\text{the fan tip rotor exit temperature}}{\text{the fan rotor entry temperature}}.$$

A core compressor to fan tip temperature rise ratio of:

$$\frac{\text{the core compressor temperature rise}}{\text{the fan tip temperature rise}}$$

is in the range from 2.67 to 3.8.

As discussed above for preceding aspects, a high propulsive efficiency and high transfer efficiency may be achieved by having a low specific thrust engine with a low fan pressure ratio and a low fan tip temperature rise. To provide a low fuel burn with this high propulsive efficiency, a high thermal efficiency of the engine is also desirable. High thermal efficiency may be provided by a high core compressor temperature rise with a high level of efficient core compression.

The core compressor temperature rise is measured across the core compressor(s) only, and not across the fan blade (by contrast, the temperature change across the fan root is included in the core temperature rise discussed in preceding aspects).

The core compressor to fan tip temperature rise ratio is therefore relatively high by virtue of the relatively high core compressor temperature rise and relatively low fan temperature rise. The engine cycle may be devised based on these parameters.

Reducing the fan tip temperature rise below the range specified above may require the use of an excessively large fan, potentially resulting in undesirable increased weight and installation constraints and reducing or negating any fuel burn benefits.

Increasing the core compressor temperature rise beyond the range specified above may overheat engine materials, potentially weakening or damaging the engine, and/or may require more cooling air so reducing or negating any efficiency benefit.

As compared to prior art engine designs, the engine as described herein may allow for one or more of reduced fuel burn, reduced noise, and/or reduced specific fuel consumption. The combination of the high core compressor temperature rise and low fan tip temperature rise may provide an improvement in fuel burn efficiency by combining increased thermal efficiency and propulsive efficiency.

The core compressor to fan tip temperature rise ratio may be in the range from 2.67 to 3.7, and optionally in the range from 2.80 to 2.95.

The fan tip temperature rise may be in the range from 1.05 to 1.11.

The core compressor temperature rise may be in the range from 2.9 to 4.0, and optionally in the range from 3.1 to 3.3.

The engine may further comprise a nacelle surrounding the fan and the engine core and defining a bypass duct outside of the engine core. The fan tip rotor exit temperature and the fan rotor entry temperature may each provide an airflow temperature across the fan blade portion in a bypass stream of air about to enter the bypass duct. The radially outer portion of each fan blade may be, comprise, or form a major part of the portion of each fan blade extending across the entrance to the bypass duct.

The engine may comprise more than one compressor. In such embodiments, the compressor exit temperature may be measured or defined at the exit from the highest pressure compressor.

The engine core may comprise a core casing arranged to separate a core airflow within the casing from a bypass airflow outside the casing. The core entry temperature may be:

(i) the temperature of the core airflow at the radial position of the forwardmost point of the core casing;

(ii) the temperature of the core airflow at the radial position of the leading edge of the forwardmost rotor or stator of the (lowest pressure) compressor; and/or (iii) the temperature of the airflow across the trailing edge of a radially inner portion of each fan blade, the airflow across the radially inner portion of each fan blade being arranged to provide the core airflow. Temperatures (i) to (iii) may be at least substantially equal.

The Overall Pressure Ratio (OPR) at cruise may be greater than 40 and lower than 80, and optionally in the range from 45 to 55.

The turbine may be a second turbine, the compressor a second compressor, and the core shaft a second core shaft. The engine core may further comprise a first turbine, a first compressor, and a first core shaft connecting the second turbine to the second compressor. The second turbine, second compressor, and second core shaft may be arranged to rotate at a higher rotational speed than the first core shaft.

A core to fan tip temperature rise ratio of:

$$\frac{\text{the core temperature rise}}{\text{the fan tip temperature rise}},$$

as defined for the fourth to sixth aspects, may be in the range from 2.845 to 3.8, and the optional features described for those aspects may also apply to the seventh and eighth aspects.

According to a ninth aspect, there is provided a method of operating a gas turbine engine on an aircraft, the gas turbine engine being as defined in the seventh or eighth aspects, wherein the method comprises operating the gas turbine engine to provide propulsion under cruise conditions such that the core compressor to fan tip temperature rise ratio is in the range from 2.67 to 3.8.

The method may further comprise operating the gas turbine engine to provide propulsion under cruise conditions such that a core to fan tip temperature rise ratio as defined for the fourth to sixth aspects may be in the range from 2.845 to 3.8, and the optional features described for those aspects may also apply to the ninth aspect.

According to a tenth aspect there is provided a gas turbine engine for an aircraft comprising an engine core comprising a turbine, a compressor, and a core shaft connecting the turbine to the compressor, and a fan located upstream of the engine core, the fan comprising a plurality of fan blades extending from a hub, each fan blade having a leading edge and a trailing edge. A compressor exit temperature is defined as an average temperature of airflow at the exit from the compressor at cruise conditions and a core entry temperature is defined as an average temperature of airflow entering the engine core at cruise conditions. A core compressor temperature rise is defined as:

$$\frac{\text{the compressor exit temperature}}{\text{the core entry temperature}}.$$

A fan rotor entry temperature is defined as an average temperature of airflow across the leading edge of each fan blade at cruise conditions, and a fan root temperature rise is defined as:

$$\frac{\text{the core entry temperature}}{\text{the fan rotor entry temperature}}.$$

A core compressor to fan root temperature rise ratio of:

$$\frac{\text{the core compressor temperature rise}}{\text{the fan root temperature rise}}$$

is in the range from 2.76 to 4.1.

As discussed above, a high propulsive efficiency may be achieved by having a low specific thrust engine with a low fan pressure ratio. The same fuel burn considerations as discussed with respect to the aspects described above may also apply.

The inventors appreciated that arranging the engine such that the temperature rise across the core compressor(s) is greater than that across the fan root may facilitate obtaining a low fuel burn gas turbine engine whilst maintaining fan operability. Most of the core temperature rise may therefore be across the core compressor(s) rather than across the fan root.

The fan root temperature rise is measured across the inner portion of the fan blades, for the gas stream entering the core, and not across the outer portions of the fan blades, for the gas stream entering the bypass duct, as is done for the fan tip temperature rise described in preceding aspects.

In some embodiments, there could be no temperature change across the fan root such that the fan root temperature rise is equal to one. As temperature will not decrease across the fan root in normal operation, the lowest value for the denominator of the core compressor to fan root temperature rise ratio is therefore one, making the value of the core compressor to fan root temperature rise ratio equal to the core compressor temperature rise. Obtaining a core compressor temperature rise greater than 4.1 is not expected with any current aerospace materials, as higher temperatures may weaken or damage the engine, and/or may require more cooling air so negating any efficiency benefit.

The core compressor to fan root temperature rise ratio is therefore relatively high by virtue of the relatively high core compressor temperature rise and relatively small change in temperature across the fan root. The engine cycle may be devised based on these parameters. The curvature of the fan root may be selected to provide a low fan root temperature rise.

As compared to known engine designs, the engine as described herein may allow for one or more of reduced fuel burn, reduced noise, and/or reduced specific fuel consumption. The combination of the high core compressor temperature rise and low fan root temperature rise may provide an improvement in fuel burn efficiency by combining increased thermal efficiency and propulsive efficiency.

The core compressor to fan root temperature rise ratio may be in the range from 2.76 to 4.10, and optionally in the range from 2.8 to 3.2.

The fan root temperature rise may be in the range from 1.03 to 1.09.

The core compressor temperature rise may be in the range from 2.9 to 4.0, and optionally in the range from 3.1 to 3.3.

The engine core may have a core radius defined between the centreline of the engine and a forwardmost tip of the engine core and the fan rotor entry temperature may be defined as the average temperature of airflow across a radially inner portion of the leading edge of each fan blade at cruise conditions. The radially inner portion of each fan blade may be, form a major part of, or comprise the portion of each fan blade at a distance from the centreline of the engine less than the core radius.

The engine may comprise more than one compressor. In such embodiments, the compressor exit temperature may be measured at the exit from the highest pressure compressor.

The engine core may comprise a core casing arranged to separate a core airflow within the casing from a bypass airflow outside the casing. The core entry temperature may be one or more of:

(i) the temperature of the core airflow at the radial position of the forwardmost point of the core casing;

(ii) the temperature of the core airflow at the radial position of the leading edge of the forwardmost rotor or stator of the (lowest pressure) compressor; and/or (iii) the temperature of the airflow across the trailing edge of a radially inner portion of each fan blade, the airflow across the radially inner portion of each fan blade being arranged to provide the core airflow.

The engine core may comprise an annular splitter at which the flow is divided between a core flow that flows through the engine core, and a bypass flow that flows along a bypass duct. Stagnation streamlines around the circumference of the engine, stagnating on a leading edge of the annular splitter, may form a streamsurface forming a radially outer boundary of a streamtube that contains all of the core flow. Each fan blade may have a radially inner portion lying within the streamtube that contains the core flow. The core entry temperature may be defined as an average temperature of airflow across the trailing edge of the radially inner portion of each fan blade at cruise conditions.

The curvature of the root portion of each fan blade may be less than the curvature across the tip portion of the blade, for example being between 40% and 60% less, and optionally around 50% less. The root portion may be the radially inner portion of the blade as described elsewhere herein, and the tip portion may be the radially outer portion of the blade as described elsewhere herein.

The Overall Pressure Ratio (OPR) at cruise may be greater than 40 and lower than 80, and optionally in the range from 45 to 55.

The turbine may be a second turbine, the compressor a second compressor, and the core shaft a second core shaft. The engine core may further comprise a first turbine, a first compressor, and a first core shaft connecting the first turbine to the first compressor. The second turbine, second compressor, and second core shaft may be arranged to rotate at a higher rotational speed than the first core shaft.

A core to fan tip temperature rise ratio of:

$$\frac{\text{the core temperature rise}}{\text{the fan tip temperature rise}},$$

as defined for the fourth to sixth aspects, may be in the range from 2.845 to 3.8, and the optional features described for those aspects may also apply to the seventh and eighth aspects.

A core compressor to fan tip temperature rise ratio of:

$$\frac{\text{the core compressor temperature rise}}{\text{the fan tip temperature rise}},$$

as defined for the seventh to ninth aspects, may be in the range from 2.845 to 3.8, and the optional features described for those aspects may also apply to the tenth aspect.

According to an eleventh aspect, there is provided a method of operating a gas turbine engine on an aircraft, the gas turbine engine being as defined in the tenth aspect, wherein the method comprises operating the gas turbine engine to provide propulsion under cruise conditions such that the core compressor to fan root temperature rise ratio is in the range from 2.76 to 4.1.

The method may further comprise operating the gas turbine engine to provide propulsion under cruise conditions such that a core to fan tip temperature rise ratio as defined for the fourth to sixth aspects may be in the range from 2.845 to 3.8, and the optional features described for those aspects may also apply to the eleventh aspect.

The method may further comprise operating the gas turbine engine to provide propulsion under cruise conditions such that a core compressor to fan tip temperature rise ratio as defined in the seventh to ninth aspects is in the range from 2.67 to 3.8, and the optional features described for those aspects may also apply to the eleventh aspect.

According to a twelfth aspect there is provided a gas turbine engine for an aircraft comprising: an engine core comprising a first turbine, a first compressor, and a first core shaft connecting the first turbine to the first compressor; and a second turbine, a second compressor, and a second core shaft connecting the second turbine to the second compressor, the second turbine being a higher pressure turbine than the first turbine and the second compressor being a higher pressure compressor than the first compressor, the engine core further comprising an annular splitter at which the flow is divided between a core flow that flows through the engine core, and a bypass flow that flows along a bypass duct, wherein stagnation streamlines around the circumference of the engine, stagnating on a leading edge of the annular splitter, form a streamsurface forming a radially inner boundary of a streamtube that contains all of the bypass flow; and a fan located upstream of the engine core, the fan comprising a plurality of fan blades extending from a hub, each fan blade having a leading edge and a trailing edge, each fan blade having a radially outer portion lying within the streamtube that contains the bypass flow. A first turbine entrance temperature is defined as an average temperature of airflow at the entrance to the first turbine at cruise conditions and a first turbine exit temperature is defined as an average temperature of airflow at the exit from the first turbine at cruise conditions, and a low pressure turbine temperature change is defined as:

$$\frac{\text{the first turbine exit temperature}}{\text{the first turbine entrance temperature}}.$$

A fan rotor entry temperature is defined as an average temperature of airflow across the leading edge of each fan blade at cruise conditions and a fan tip rotor exit temperature is defined as an average temperature of airflow across the radially outer portion of each fan blade at the trailing edge at cruise conditions and a fan tip temperature rise is defined as:

$$\frac{\text{the fan tip rotor exit temperature}}{\text{the fan rotor entry temperature}}.$$

A turbine to fan tip temperature change ratio of:

$$\frac{\text{the low pressure turbine temperature change}}{\text{the fan tip temperature rise}}$$

is in the range from 1.46 to 2.0.

According to a thirteenth aspect, there is provided a gas turbine engine for an aircraft comprising: an engine core having a core radius defined between the centreline of the engine and a forwardmost tip of the engine core, the engine core comprising a first turbine, a first compressor, and a first core shaft connecting the first turbine to the first compressor; and a second turbine, a second compressor, and a second core shaft connecting the second turbine to the second compressor, the second turbine being a higher pressure turbine than the first turbine and the second compressor being a higher pressure compressor than the first compressor, and a fan located upstream of the engine core, the fan comprising a plurality of fan blades extending from a hub, each fan blade having a leading edge and a trailing edge, each fan blade having a radially outer portion defined as the portion of each fan blade at a distance from the centreline of the engine greater than the core radius. A first turbine entrance temperature is defined as an average temperature of airflow at the entrance to the first turbine at cruise conditions and a first turbine exit temperature is defined as an average temperature of airflow at the exit from the first turbine at cruise conditions, and a low pressure turbine temperature change is defined as:

$$\frac{\text{the first turbine exit temperature}}{\text{the first turbine entrance temperature}}.$$

A fan rotor entry temperature is defined as an average temperature of airflow across the leading edge of each fan blade at cruise conditions, and a fan tip rotor exit temperature is defined as an average temperature of airflow across the radially outer portion of each fan blade at the trailing edge at cruise conditions. A fan tip temperature rise is defined as:

$$\frac{\text{the fan tip rotor exit temperature}}{\text{the fan rotor entry temperature}},$$

and a turbine to fan tip temperature change ratio of:

$$\frac{\text{the low pressure turbine temperature change}}{\text{the fan tip temperature rise}}$$

is in the range from 1.46 to 2.0.

To achieve a high propulsive efficiency without compromising transfer efficiency (how efficiently energy is transferred from the core stream to the bypass stream), the inventors appreciated that there should be a low fan tip temperature rise as discussed above.

The inventors appreciated that designing the engine to have a relatively large temperature change across the lower pressure turbine(s) may allow more work to be extracted more efficiently. Increasing, or maximising, the temperature change across the low pressure turbine may therefore provide various advantages. The skilled person would appreciate that the temperature change across the turbine(s), from front to back, is generally a fall in temperature—a larger, or increased, temperature change is therefore a larger fall or drop in temperature (a larger magnitude of change), which may be thought of as a more negative temperature change (as compared to the temperature rises discussed elsewhere).

The turbine to fan tip temperature change ratio is therefore relatively high by virtue of the relatively high low pressure turbine temperature change and relatively low fan tip temperature rise. The engine cycle may be devised based on these parameters.

As compared to known engine designs, the engine as described herein may allow for one or more of reduced fuel burn, reduced noise, and/or reduced specific fuel consumption. Engines according to this aspect may have a high transfer efficiency due to extracting work efficiently from the core stream using the low pressure turbine, and applying that using an efficient, low temperature rise, fan.

The turbine to fan tip temperature change ratio may be in the range from 1.5 to 1.8

The fan tip temperature rise may be in the range from 1.05 to 1.1, and optionally may be equal to 1.11.

The low pressure turbine temperature change may be in the range from 1.6 to 1.85, and optionally in the range from 1.65 to 1.8.

The engine may comprise more than two turbines. In such embodiments, the highest pressure turbine of the engine may be selected as the second turbine and the lowest pressure turbine of the engine may selected as the first turbine.

The Overall Pressure Ratio (OPR) at cruise may be greater than 40 and lower than 80, and optionally in the range from 45 to 55.

The first (low pressure) turbine may have four or more rotor stages.

According to a fourteenth aspect, there is provided a method of operating a gas turbine engine on an aircraft, the gas turbine engine being as defined in the twelfth or thirteenth aspects, wherein the method comprises operating the gas turbine engine to provide propulsion under cruise conditions such that the turbine to fan tip temperature change ratio is in the range from 1.46 to 2.0.

According to a fifteenth aspect there is provided a gas turbine engine for an aircraft comprising: an engine core comprising a first turbine, a first compressor, and a first core shaft connecting the first turbine to the first compressor; and a second turbine, a second compressor, and a second core shaft connecting the second turbine to the second compressor, the second turbine being a higher pressure turbine than the first turbine and the second compressor being a higher pressure compressor than the first compressor, and a fan located upstream of the engine core, the fan comprising a plurality of fan blades extending from a hub. A second turbine entrance temperature is defined as an average temperature of airflow at the entrance to the second turbine at cruise conditions, a first turbine entrance temperature is defined as an average temperature of airflow at the entrance to the first turbine at cruise conditions, a second turbine exit temperature is defined as an average temperature of airflow at the exit from the second turbine at cruise conditions, and a first turbine exit temperature is defined as an average temperature of airflow at the exit from the first turbine at cruise conditions. A low pressure turbine temperature change is defined as:

$$\frac{\text{the first turbine entrance temperature}}{\text{the first turbine exit temperature}},$$

and
a high pressure turbine temperature change is defined as:

$$\frac{\text{the second turbine entrance temperature}}{\text{the first turbine entrance temperature}}.$$

A low to high pressure turbine temperature change ratio of:

$$\frac{\text{the low pressure turbine temperature change}}{\text{the high pressure turbine temperature change}}$$

is in the range from 1.09 to 1.25.

The inventors appreciated that, to reduce fuel burn in a (optionally geared) gas turbine engine with two turbines, there is an optimal level and split of temperature rise and work between the two turbines. In such an engine with two turbines, the first turbine may be a lower pressure turbine and be arranged to drive a core shaft, and thereby to drive the fan (optionally via a gearbox); the second turbine may be a higher pressure turbine and may be connected to a different, second, core shaft. The higher pressure turbine may be replaced with multiple turbines in some embodiments.

To reduce fuel burn, and optionally reduce or minimise core size, and/or increase or maximise thermal efficiency across the high pressure turbine, the inventors appreciated that a relatively low temperature change across the higher pressure turbine is beneficial.

As the fan in a high bypass ratio turbofan generally generates most of the thrust, the inventors appreciated that efficiency of energy transfer from the low pressure turbine to the fan should be improved, and that increasing or maximising the temperature drop/change across the low pressure turbine(s) (LPT) may therefore be beneficial, noting that the LPT in a geared engine is generally more efficient than the high pressure turbine (HPT). The temperature change across the LPT is therefore larger relative to that across the HPT.

The low to high pressure turbine temperature change ratio is therefore relatively high by virtue of the relatively large low pressure turbine temperature change and relatively small high pressure turbine temperature change. The engine cycle may be devised based on these parameters.

As compared to known engine designs, the engine as described herein may allow for one or more of reduced fuel burn, reduced noise, and/or reduced specific fuel consumption.

Reduced fuel burn may therefore be achieved due to a combination of a relatively high thermal efficiency from improved loading of the turbines and a relatively high transfer efficiency from improved loading of the LPT and increasing of the temperature change across it.

The low to high pressure turbine temperature change ratio may be in the range from 1.10 to 1.25.

The low pressure turbine temperature change may be in the range from 1.6 to 1.85, and optionally in the range from 1.65 to 1.8.

The high pressure turbine temperature change may be in the range from range from 1.40 to 1.55, and optionally in the range from 1.44 to 1.52.

The first turbine may be arranged to receive airflow from the exit of the second turbine, such that the first turbine entrance temperature may be at least substantially equal to the second turbine exit temperature (e.g. barring the effect of any introduced cooling air or the likes between the two).

The engine may comprise more than two turbines. The highest pressure turbine of the engine may be selected as the second turbine and the lowest pressure turbine of the engine may be selected as the first turbine in such embodiments.

The engine may comprise:

(i) a total of two turbines, and the first turbine entrance temperature may be at least substantially equal to the second turbine exit temperature in such embodiments; or (ii) more than two turbines, and the high pressure turbine temperature change may provide a measure of the temperature change across all turbines except the lowest pressure turbine in such embodiments.

The Overall Pressure Ratio (OPR) at cruise may be greater than 40 and lower than 80, and optionally in the range from 45 to 55.

The first (low pressure) turbine may comprise at least four rotor stages.

A turbine to fan tip temperature change ratio of:

$$\frac{\text{the low pressure turbine temperature change}}{\text{the fan tip temperature rise}}$$

as defined in the twelfth, thirteenth and fourteenth aspects may be in the range from 1.46 to 2.0. The optional features described with respect to those aspects may also apply to the fifteenth aspect.

According to a sixteenth aspect, there is provided a method of operating a gas turbine engine on an aircraft, the gas turbine engine being as defined in the fifteenth aspect, wherein the method comprises operating the gas turbine engine to provide propulsion under cruise conditions such that the low to high pressure turbine temperature change ratio is in the range from 1.09 to 1.30.

The method may further comprise operating the gas turbine engine to provide propulsion under cruise conditions such that the turbine to fan tip temperature change ratio as defined in the twelfth, thirteenth and fourteenth aspects may be in the range from 1.46 to 2.0. The optional features described with respect to those aspects may also apply to the sixteenth aspect.

In any of the aspects described above, one or more of the following features may apply:

A specific thrust of the engine at cruise conditions, defined as net engine thrust divided by mass flow rate through the engine, may be in the range from 50 to 100 $\text{Nkg}^{-1}$ s, and optionally below 90 $\text{Nkg}^{-1}$ s.

A quasi-non-dimensional mass flow rate Q may be defined as:

$$Q = W \frac{\sqrt{T_0}}{P_0 \cdot A_{fan}},$$

where:

W is mass flow rate through the fan in Kg/s;

$T_0$ is average stagnation temperature of the air at the fan face in Kelvin;

$P_0$ is average stagnation pressure of the air at the fan face in Pa;

$A_{fan}$ is the area of the fan face in m²;

Q may have a value in the range from 0.025 to 0.038 $\text{Kgs}^{-1}\text{N}^{-1}\text{K}^{1/2}$ at cruise conditions, and optionally in the range from 0.031 to 0.036 $\text{Kgs}^{-1}\text{N}^{-1}\text{K}^{1/2}$. Q may take a value less than or equal to 0.035 $\text{Kgs}^{-1}\text{N}^{-1}\text{K}^{1/2}$ at cruise conditions.

A fan tip loading at cruise conditions may be defined as $dH/U_{tip}^2$, where dH is the enthalpy rise across the fan (23) and $U_{tip}$ is the (translational) velocity of the fan tip (68) is in the range from 0.25 to 0.4, and optionally from 0.28 to 0.34, and wherein further optionally the fan tip loading takes a value in the range from 0.29 to 0.31 at cruise conditions.

Cruise conditions may mean the conditions at mid-cruise of an aircraft to which the engine is attached, and optionally may mean the conditions experienced by the aircraft and engine at the midpoint between top of climb and start of descent.

The forward speed of the gas turbine engine at cruise conditions may be in the range of from Mn 0.75 to Mn 0.85, and, optionally, the forward speed of the gas turbine engine at cruise conditions may be Mn 0.8.

The cruise conditions may correspond to atmospheric conditions defined by the International Standard Atmosphere at an altitude of 11582 m and a forward Mach Number of 0.8. Alternatively, cruise conditions may correspond to atmospheric conditions defined by the International Standard Atmosphere at an altitude of 10668 m and a forward Mach Number of 0.85. The cruise conditions may correspond to atmospheric conditions at an altitude that is in the range of from 10500 m to 11600 m, and optionally at an altitude of 11000 m.

The fan tip radius may be in the range from 110 cm to 150 cm; or in the range from 155 cm to 200 cm.

The gas turbine engine may further comprise a gearbox that receives an input from the core shaft and outputs drive to the fan so as to drive the fan at a lower rotational speed than the core shaft. Optionally, the gearbox may have a gear ratio in the range of from 3.2 to 5, further optionally in the range from 3.2 to 3.8.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft. In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38, 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform. The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4. The fan tip loading may be in an inclusive range bounded by any two of the values in the previous sentence (i.e. the values may form upper or lower bounds), for example in the range of from 0.28 to 0.31, or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of form 12 to 16, 13 to 15, or 13 to 14. The bypass duct may be substantially annular. The bypass duct may be radially outside the core engine. The radially outer surface of the bypass duct may be defined by a nacelle and/or a fan case.

The overall pressure ratio (OPR) of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70. By way of further example, the OPR at cruise may be in the range from 45 to 65; optionally from 45 to 55; and further optionally equal to or around 52.

Specific thrust of an engine may be defined as the net thrust of the engine divided by the total mass flow through the engine. At cruise conditions, the specific thrust of an engine described and/or claimed herein may be less than (or on the order of) any of the following: 110 Nkg$^{-1}$ s, 105 Nkg$^{-1}$ s, 100 Nkg$^{-1}$ s, 95 Nkg$^{-1}$ s, 90 Nkg$^{-1}$ s, 85 Nkg$^{-1}$ s or 80 Nkg$^{-1}$ s. The specific thrust may be in an inclusive range bounded by any two of the values in the previous sentence (i.e. the values may form upper or lower bounds), for example in the range of from 80 Nkg$^{-1}$ s to 100 Nkg$^{-1}$ s, or 85 Nkg$^{-1}$ s to 95 Nkg$^{-1}$ s. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance-between top of climb and start of descent. Cruise conditions thus define an operating point of the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft-steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Embodiments will now be described by way of example only, with reference to the Figures, in which.

Figure 1:
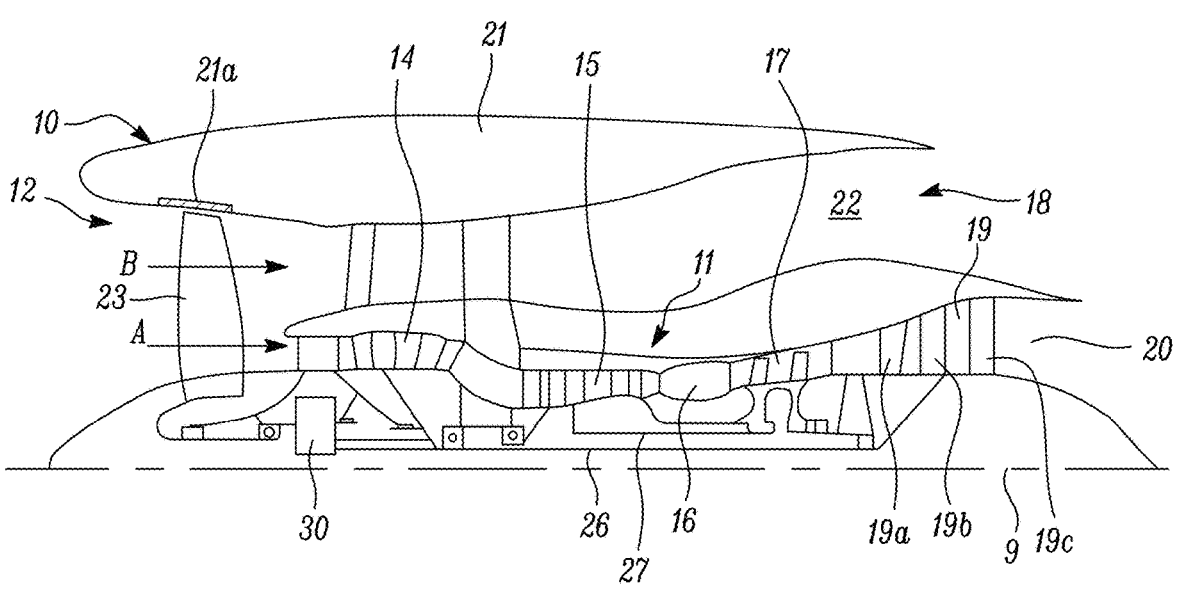
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In the embodiment being described, the nacelle inner radius at the axial position of the leading edge blade tips 68a is arranged to be slightly larger than the fan tip radius 102, such that the fan 23 can fit within the nacelle 21 without the blade tips 68 rubbing the nacelle 21. More particularly, in the embodiment being described the engine 10 comprises an engine fancasing 21a adjacent the blade tips 68a; the nacelle 21 is mounted on/around the engine fancasing 21a such that the engine fancasing 21a and the nacelle 21 form and surround an outer surface of the gas path though the engine 10. Fancasing inner radius at the axial position of the leading edge blade tips 68a is arranged to be slightly larger than the fan tip radius 102, such that the fan 23 can fit within the engine fancasing 21a without the blade tips 68 rubbing the fan casing 21a. In some alternative embodiments, the blade tips 68a may be arranged to rub the fancasing 21a.

In the embodiments shown in the Figures, the engine fancasing 21a extends only in the region of the fan 23. In alternative embodiments, the fancasing 21a may extend rearwardly, for example to the axial location of a bypass duct outlet guide vane (OGV) 58.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine

17 drives the high pressure compressor 15 by a suitable interconnecting shaft 27. The fan 23 generally provides the majority of the propulsive thrust. The epicyclic gearbox 30 is a reduction gearbox.

Figure 2:
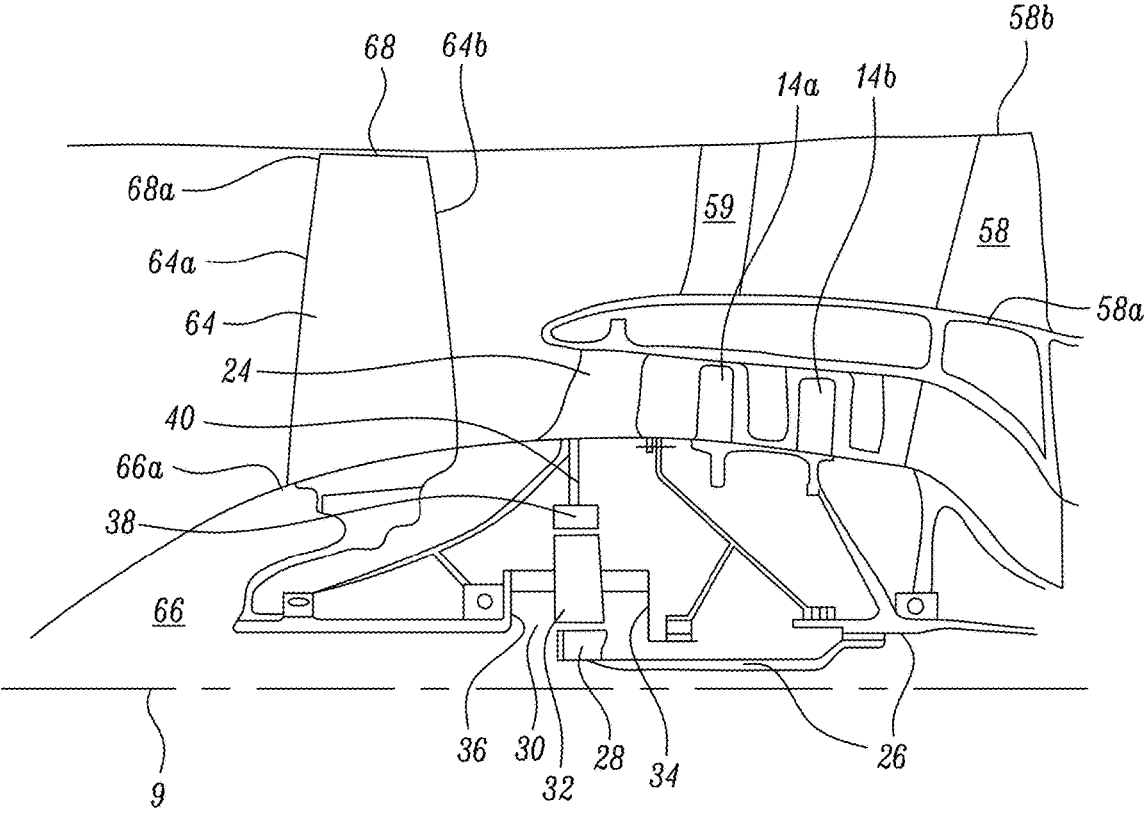
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Each of the compressors provided in the gas turbine engine 10 (e.g. the lower pressure compressor 14 and the high pressure compressor 15) comprises any number of compression stages, for example multiple compression stages. Each compression stage may comprise a row of rotor blades and a row of stator vanes that are axially offset from each other. The fan 23 also provides compression of airflow, and so provides an additional compression stage separate from those of the low and high pressure compressors 14, 15. A compression stage number is defined as the total number of compression stages provided by the fan 23 and the one or more compressors 14, 15 provided in the gas turbine engine 10. In the presently described embodiment, the compression stage number is therefore the sum of the compression stages provided in the low pressure compressor 14, the high pressure compressor 15 and the fan 23.

In other embodiments, the compression stages provided in the compressors 14, 15 of the gas turbine engine may not be axial compression stages. In some embodiments, one or more radial compression stages may be provided in addition, or alternatively, to the axial compression stages provided in each compressor. For example, in one embodiment, the low pressure compressor 14 and/or the high pressure compressor 15 may comprise one or more axial compression stages (each formed by a row of rotor blades and stators) followed by a radial compression stage provided downstream of the axial compression stage or stages. In yet other embodiments, each of the compressors may comprise only radial compression stages. The compression stage number is defined as the total number of compression stages, including both radial and axial compression stages (including the fan 23). In all of the embodiments described above, each radial compression stage may comprise a centrifugal compressor.

Figure 3:
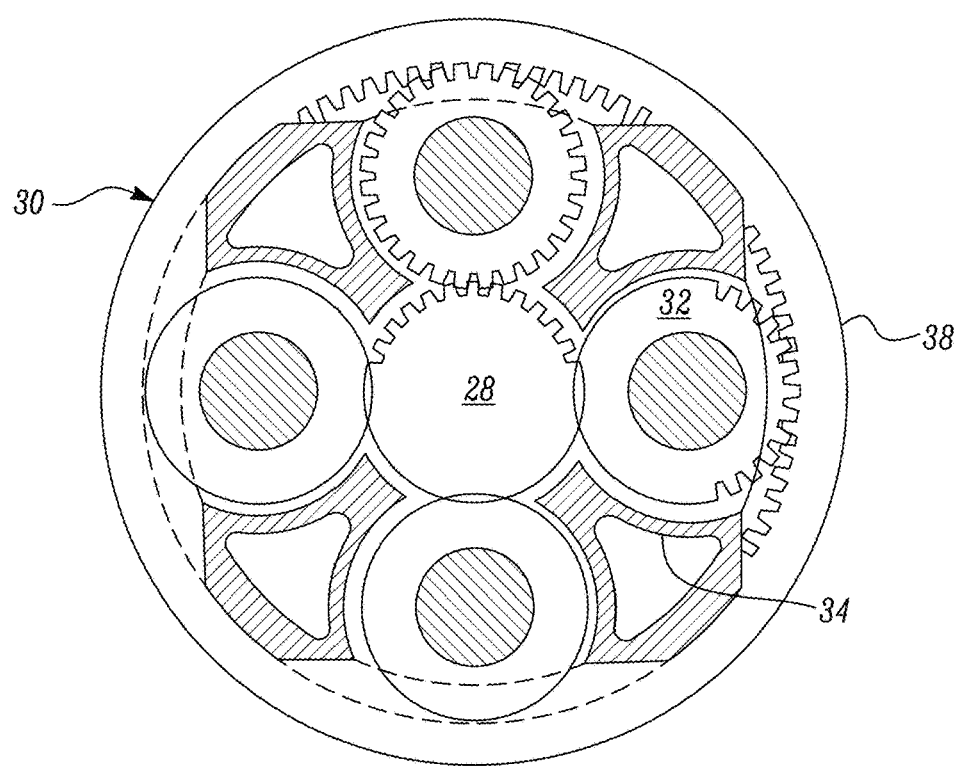
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4A:
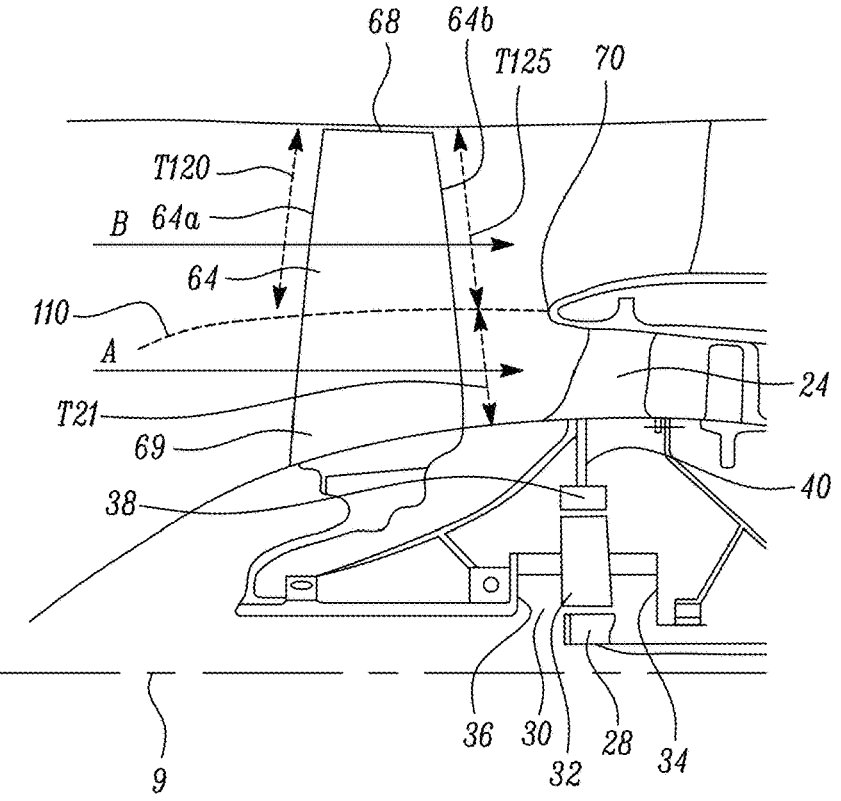
FIG. 4A is a close up sectional side view of an upstream portion of the gas turbine engine shown in FIG. 2, with indications of where various temperatures are to be measured marked.
Figure 4B:
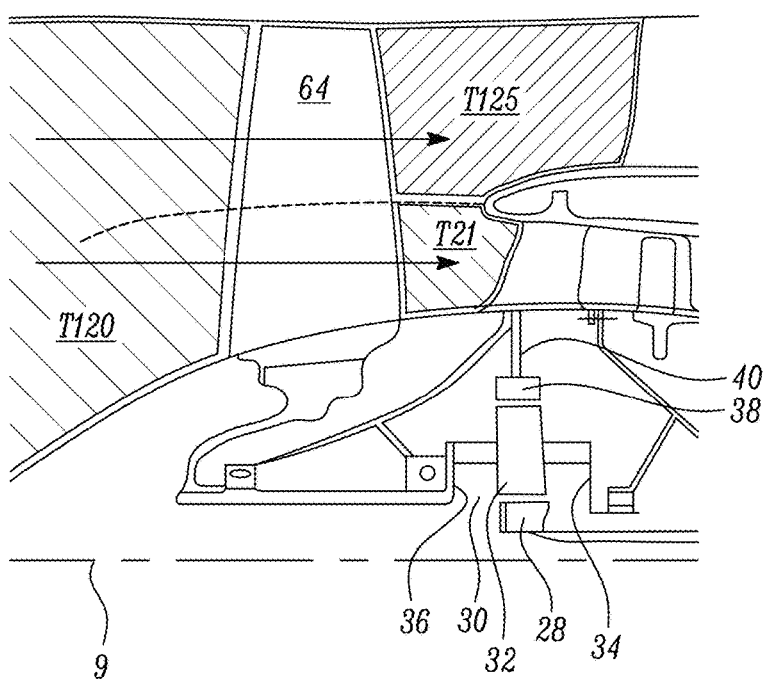
FIG. 4B is the close up sectional side view of FIG. 4A with regions within which the various temperatures may be measured marked.

As noted above, downstream of the fan 23 the air splits into two separate flows: a first air flow A into the engine core 11 and a second air flow B which passes through the bypass duct 22 to provide propulsive thrust. Referring to FIGS. 4A and 4B, the first and second airflows A, B split at a generally annular splitter 70, for example at the leading edge of the generally annular splitter 70 at a generally circular stagnation line. The splitter 70 is provided by a forwardmost portion of the core casing 11a in the embodiments being described, and may alternatively be referred to as a forwardmost tip 70 of the engine core 11 in some embodiments.

A stagnation streamline 110 stagnates on the leading edge of the splitter 70. The stagnation streamlines 110 around the circumference of the engine 10 form a streamsurface 110. All of the flow A radially inside this streamsurface 110 ultimately flows through the engine core 11. The streamsurface 110 forms a radially outer boundary of a streamtube that contains all of the flow that ultimately flows through the engine core, which may be referred to as the core flow A. All of the flow B radially outside the streamsurface 110 ultimately flows through the bypass duct 22. The streamsurface 110 forms a radially inner boundary of a streamtube that contains all of the flow B that ultimately flows through the bypass duct 22, which may be referred to as the bypass flow B. The streamsurface 110, and correspondingly the streamtube, may be defined at cruise conditions.

The flow at the fan exit that subsequently flows through the engine core 11 may therefore be defined by a streamtube that extends from the fan exit to the engine core 11. Such a streamtube may be bounded by a radially outer surface that terminates at the splitter 70, i.e. by a radially outer surface that is formed by streamlines 110 that terminate at a stagnation point on the splitter 70. Such a streamtube may be generally annular. For example a cross-section through such a streamtube may be substantially annular at any given cross-section perpendicular to the engine (rotational) axis 9.

Definitions of various temperatures, radii, and other parameters are provided below for ease of reference.

Fan Tip Radius:

The radius 102 of the fan 23, also referred to as the fan tip radius 102, or $R_{fan\ tip}$, may be measured between the engine centreline 9 and the tip 68a of a fan blade 64 at its leading edge 64a (in a radial direction). The fan diameter (D) may simply be defined as twice the radius 102 of the fan 23.

In the embodiments being described, the fan tip radius 102 is in the range from 95 cm to 200 cm, or from 110 cm to 200 cm. In some embodiments, the fan tip radius is in the range from 95 cm to 150 cm or from 110 cm to 150 cm. In some alternative embodiments, the fan tip radius is in the range from 155 cm to 200 cm In some embodiments, the fan diameter is in the range from 190 cm to 300 cm, or 220 cm to 300 cm. In some alternative embodiments, the fan diameter is in the range from 310 cm to 400 cm.

The skilled person would appreciate that fan blades 64 may expand in operation, and that the fan tip radius 102 under cruise conditions may be slightly greater than the fan tip radius 102 measured when the fan 23 is not in use. Fan tip radius 102 may be defined under cruise conditions. However, the skilled person would appreciate that the change in fan tip radius 102 is generally small compared to the fan tip radius and that the radius as measured when not in operation may be used.

Hub Radius:

The hub radius, $R_{hub}$, is the (radial) distance 103 (in metres) between the centreline 9 of the engine 10 and the radially inner point on the leading edge 64a of the fan blade (i.e. of radially inner point of the gas-washed surface of the fan blade)—this is equivalent to the radius of the hub 66 of the fan 23 at the point at which the leading edge of each blade 64 extends therefrom.

Fan Area:

The fan face area, $A_{fan}$, which may also be described as the flow area of the fan, is defined as the annular area between fan blade tips 68 and the hub 66 at the axial position of the fan blade leading edge tip 68a. The fan face area is measured in a radial plane (i.e. a plane perpendicular to the engine axis 9 and containing radii of the engine at the axial position of the plane). The skilled person will appreciate that $A_{fan}$ is at least substantially equivalent to the area of the annulus formed between the hub 66 of the fan 23 and the inner surface of the nacelle 21 immediately adjacent the leading edge blade tips (as the blade tip leading edges 64a are arranged to lie very close to the inner surface of the nacelle 21—noting the above comments about the fancasing 21a) for the fan engine 10 being described, and is therefore equivalent to the fan face area minus the area taken by the hub 66.

As referred to herein, the flow area of the fan ($A_{fan}$) is defined as:

$$A_{fan} = \pi\left(R_{fan\,tip}^2 - R_{hub}^2\right)$$

Where:
$R_{fan\,tip}$ is the radius 102 (in metres) of the fan 23 at the leading edge (i.e. at the tips 68a of the leading edge of the fan blades 64);
$R_{hub}$ is the distance 103 (in metres) between the centreline of the engine and the radially inner point on the leading edge of the fan blade (i.e. of radially inner point of the gas-washed surface of the fan blade)—this is equivalent to the radius of the hub 66 of the fan 23 at the point at which the leading edge of each blade 64 is connected thereto, and may be referred to as the hub radius 103.

In various embodiments, the ratio of the radius of fan blade 64 at its hub 66 to the radius of the fan blade at its tip 68 may be less than 0.33.

In the embodiment being described, the flow area is defined in a radial plane, and can therefore be calculated using the fan tip radius 102 and the hub radius 103.

In the embodiments being described, the fan tip radius 102 is in the range from 95 cm to 200 cm, or from 110 cm to 200 cm. In some embodiments, the fan tip radius is in the range from 95 cm to 150 cm or from 110 cm to 150 cm. In some alternative embodiments, the fan tip radius is in the range from 155 cm to 200 cm In some embodiments, the fan diameter (twice the fan radius 102) is in the range from 190 cm to 300 cm, or 220 cm to 300 cm. In some alternative embodiments, the fan diameter is in the range from 310 cm to 400 cm.

Q:
A quasi-non-dimensional mass flow rate, Q, may be defined as:

$$Q = W\frac{\sqrt{T_0}}{P_0 \cdot A_{fan}},$$

where:
W is mass flow rate through the fan in Kg/s;
$T_0$ is average stagnation temperature of the air at the fan face in Kelvin;
$P_0$ is average stagnation pressure of the air at the fan face in Pa;
$A_{fan}$ is the area of the fan face in m$^2$.

As referred to herein, the area of the fan face ($A_{fan}$) is defined as:

$$A_{fan} = \frac{\pi D^2}{4}\left(1 - \left(\frac{h}{t}\right)^2\right)$$

Where:
D is the diameter (in metres) of the fan at the leading edge (i.e. at the tips of the leading edge of the fan blades);
h is the distance (in metres) between the centreline of the engine and the radially inner point on the leading edge of the fan blade (i.e. of radially inner point of the gas-washed surface of the fan blade); and
t is the distance (in metres) between the centreline of the engine and the radially outer point on the leading edge of the fan blade (i.e. t=D/2)

$A_{fan}$ may also be referred to as a fan flow area as it corresponds to the gas-washed area of the fan (the blade-swept area outside of the hub). This may be equivalently represented as:

$$A_{fan} = \pi\left(R_{fan\,tip}^2 - R_{hub}^2\right)$$

as described above.

At cruise conditions, the value of Q may be in the range of from: 0.0295 to 0.0335; 0.03 to 0.033; 0.0305 to 0.0325; 0.031 to 0.032 or on the order of 0.031 or 0.032 Kgs$^{-1}$N$^-$ $_1$K$^{1/2}$. Thus, it will be appreciated that the value of Q may be in a range having a lower bound of 0.029, 0.0295, 0.03, 0.0305, 0.031, 0.0315 or 0.032 and/or an upper bound of 0.031, 0.0315, 0.032, 0.0325, 0.033, 0.0335, 0.034, 0.0345 or 0.035. All values of Q referred to herein are provided in units of Kgs$^{-1}$N$^{-1}$K$^{1/2}$.

Temperatures

All temperatures referred to herein are total temperatures; the sum of static temperature plus velocity/kinetic energy effects. Total temperatures may also be referred to as stagnation temperatures. All temperature values are listed in Kelvin, unless otherwise stated and all temperature ratios and rises are likewise calculated in Kelvin. All temperatures are defined at cruise conditions, as defined above. In particular, the ISA standards for cruise conditions may provide an indication of an expected ambient temperature. "Average" temperature is used to indicate a mean temperature.

In the embodiments being described, temperatures may be defined or measured at the mid-cruise aerodynamic design point, which is defined as Mn 0.85, and an altitude of 10700 m (35,000 ft), and optionally more particularly of 10668 m, for engines 10 of the embodiments being described. The skilled person would appreciate that these cruise conditions are provided by way of example only and may vary for engines 10 of other embodiments. Under differing conditions, the absolute temperature values may vary whilst the ratios remain within the ranges described.

The following temperatures are referred to herein, and a more detailed description of each is provided below in Table 1. The numbering used for the temperatures corresponds to that provided in SAE standard AS755F.

otherwise determined in various ways, for example by use of a temperature probe or rake, by modelling, or by indirect determination from a temperature measured (or otherwise determined) elsewhere in the engine 10. For example, T125 (fan tip exit temperature) may be measured by one or more probes mounted on a leading edge of an outlet guide vane 59 in the bypass duct 22 (for example the closest OGV 59 to the fan 23, if multiple bypass duct OGVs are present), or by a rake anywhere in the region labelled in FIG. 4B. Similarly, T21 (fan root exit temperature) may be measured by one or more probes mounted on a leading edge of an outlet guide

TABLE 1

| Temperatures | | |
| --- | --- | --- |
| | | Approximate temperature in various embodiments (Kelvin) |
| T120 | the fan (tip) rotor 23 entry temperature (approximately equal across full blade length - therefore generally equal to the fan root rotor entry temperature T20) | In the range 235 to 265; optionally in the range 242 to 252 May be, for example 244 or 250 (altitude- and Mach number-dependent) |
| T125 | the fan tip rotor 23 exit temperature (may vary along the blade length - defined as an average across a radially outer portion of the blade unless otherwise specified) | In the range 260 to 285; optionally in the range 270 to 280 May be, for example 270 for a T120 of 244, or 278 for a T120 of 250 |
| T30 | the compressor 15 exit temperature (at the exit from the highest pressure compressor in embodiments with multiple compressors) | In the range 750 to 1050; optionally in the range of 780 or 815 to 1000 May be, for example, 834, 835 or 1000 |
| T21 | the core 11 entry temperature (may be equivalent to a fan root 69 exit temperature) | In the range 245 to 270; optionally in the range 260 to 270 May be, for example, 260, 268 or 252 |
| T42 | a second (higher/highest pressure) turbine 17 exit temperature T42 (also at least substantially equal to the first (low pressure) turbine 19 entrance temperature T44 in the embodiments described) | In the range 960 to 1150; optionally in the range 1030 to 1100 or 1030 to 1090. May be, for example, 995, 1030 or 1100 |
| T50 | a first (low pressure) turbine 19 exit temperature | In the range 590 to 640; optionally in the range 600 to 630 or 605 to 615. May be, for example, 600, 612 or 630 |
| T40 | the second (high pressure) turbine 17 entry temperature | In the range 1400 to 1700; optionally in the range 1450 to 1650, or 1520 to 1570 May be, for example, 1480, 1560 or 1650 |

For example, in one embodiment having a fan diameter in the range from 330 to 380 cm, T120 may be 250 K and T125 may be 278 K, giving a temperature increase across the fan 23 of 28 Kelvin. The compressor exit temperature (T30) may be 834 K. The core entry temperature (T21) may be 268 K. The second turbine exit temperature (T42) may be 1030 K and the first turbine exit temperature (T50) may be 612 K. The second turbine entry temperature (T40) may be 1560 K, giving a temperature decrease across the second turbine 17 of 530 K.

For example, in an alternative embodiment having a fan diameter in the range from 240 cm to 280 cm, T120 may be 245 K and T125 may be 270 K, giving a temperature increase across the fan 23 of 25 Kelvin. The compressor exit temperature (T30) may be 780 K. The core entry temperature (T21) may be 260 K. The second turbine exit temperature (T42) may be 1000 K and the first turbine exit temperature (T50) may be 630 K. The second turbine entry temperature (T40) may be 1480 K, giving a temperature decrease across the second turbine 17 of 480 K.

The skilled person would appreciate that one or more of the temperatures listed in Table 1 may be measured or vane 24 in the core duct, or by a rake anywhere in the region labelled in FIG. 4B.

The skilled person would appreciate that one or more of the temperatures listed in Table 1 may be difficult to measure practically, for example the relatively high temperature T40. Various temperatures may therefore be inferred from temperature measurements elsewhere and a knowledge of engine properties and temperature relationships.

The fan 23, which is located upstream of the engine core 11, comprises a hub 66 and a plurality of fan blades 64 extending from the hub 66. Each fan blade 64 has a leading edge 64a and a trailing edge 64b.

The fan rotor entry temperature (T120) is defined as an average temperature of airflow across the leading edge 64a of each fan blade 64 at cruise conditions; in particular, the temperature may be defined across a radially outer portion of the leading edge 64a of each fan blade 64 at cruise conditions. The skilled person would appreciate that the temperature across the leading edge 64a of each fan blade 64 may be at least substantially equal across the entire leading edge 64a of the fan blade 64, and that an average across the outer portion (or across the whole blade length) may be taken.

More specifically, T120 may be used to refer to the temperature across a radially outer (fan tip) portion of the leading edge 64a of each fan blade 64 at cruise conditions and T20 may be used to refer to the temperature across a radially inner (fan root) portion of the leading edge 64a of each fan blade 64 at cruise conditions. The term fan rotor entry temperature may therefore be used generally for T120 or T20.

The fan rotor entry temperature T120 may be higher than the ambient temperature, for example by around 30 K in some embodiments, due to dynamic head/Mach number-related effects. The fan rotor entry temperature (T120) may therefore be measured or calculated anywhere within a relatively large region, as illustrated in FIG. 4B (anywhere within the nacelle 21 and up to the fan blades 64, as the increase of around 30 K from ambient may occur at or near the forward-most edge of the nacelle 21), but may more specifically be measured at or adjacent the fan's leading edge 64a. The Fan Rotor Entry Temperature, T120, is around 250K in the embodiment being described. The skilled person would appreciate that this may vary in other embodiments, based on factors such as altitude of cruise.

A radially outer portion of each fan blade 64 is selected in line with standards for the definition of T120, and for convenience of comparison with other temperatures as described below. The skilled person would appreciate that, for the engine 10 shown at cruise, T10 (temperature at the nacelle's forward-most point) is at least substantially equal to T120 (temperature at the leading edge 64a of an outer region of the fan blade 64/near the fan tip), as the Mach number based temperature increase takes effect from that point, and that T10 and T120 may also be substantially equal to T20 (temperature at the leading edge 64a of an inner region of the fan blade 64/near the fan root).

The radially outer portion of each fan blade 64 may be defined as the portion of each fan blade 64 washed by the bypass airflow B, which flows around the outside of the engine core 11 after passing the fan 23 (as opposed to the core airflow, A, which passes through the core 11). This bypass airflow B flows through the bypass duct 22 in the embodiments described herein.

In the embodiment being described, the engine core 11 has a core radius 105 defined between the centreline 9 of the engine 10 and a forwardmost tip of the engine core 11; the forwardmost tip may be referred to as the splitter 70, as it divides the core airflow A from the bypass airflow B. The radially outer portion of each fan blade 64 is generally the portion of each fan blade 64 at a radial distance from the centreline 9 of the engine 10 greater than the core radius 105.

The skilled person would appreciate that, in reality the streamsurface 110 may slope and/or curve relative to the engine axis 9, such that some of the gas stream passing the fan blade 64 at a radial distance from the centreline 9 of the engine 10 slightly less than or equal to the core radius 105 may still enter the bypass stream B in some embodiments. In the embodiments being described, the slope and/or curvature of the streamsurface 110 relative to the engine axis 9 is relatively small, such that using the radial position of the splitter 70 provides an at least substantially equivalent temperature to using the streamsurface 110, within measurement errors. The division at a set radial position may therefore provide an equivalent value which may be easier to determine than streamtube shape in some scenarios.

The gas turbine engine 10 of the embodiment being described comprises a nacelle 21 surrounding the fan 23 and the engine core 11 and defining a bypass duct 22 outside of the engine core 11. The bypass airflow B flows through the bypass duct 22 after leaving the fan 23 in the embodiments being described. The radially outer portion of each fan blade 64 is therefore the portion of each fan blade 64 extending across the entrance to the bypass duct 22 in the embodiments being described.

The fan tip rotor exit temperature (T125) is defined as an average temperature of airflow over the radially outer portion of each fan blade 64 at the trailing edge 64b of each fan blade 64 at cruise conditions. The radially outer portion is as defined for the leading edge 64a. T125 therefore corresponds to the temperature of the bypass stream B on leaving the fan 23.

The fan tip rotor exit temperature (T125) and the fan rotor entry temperature (T120) both therefore refer to airflow temperatures across the fan blade portion which is located in a bypass stream of air B about to enter the bypass duct 22 (the radially outer fan blade portion).

The Fan Rotor Entry Temperature, T20, may also refer to airflow temperatures across the leading edge of the fan blade portion which is located in a core stream of air A about to enter the engine core 11 (the radially inner fan blade portion/the portion of the gas stream radially inward of the streamsurface 110), as the temperature is equivalent across the leading edge 64a of the blade 64. This is generally not the same for the exit temperature T125, T21, as the temperature generally varies with radius across the trailing edge 64b of each blade.

The skilled person would appreciate that airflow temperature generally increases across the fan 23 when at cruise conditions, as work is done on the air by the fan blades 64 and some of this work generally manifests as heat. The exit temperature T125, T21 is therefore generally higher than the entry temperature T120, T20.

The ratio of the fan tip rotor exit temperature T125 to the fan tip rotor entry temperature T120, T125/T120 may therefore be referred to as the fan tip temperature rise. The fan tip temperature rise may be defined as the average temperature rise across the fan rotor portion in the bypass stream (B in FIG. 1). The fan tip temperature rise is greater than one, and more specifically is in the range from 1.11 to 1.05, in the embodiments being described. The temperature rise may be defined as the ratio of the mean total temperature of the flow at the fan exit that subsequently flows (as flow B) around the outside of the engine core 11 to the mean total temperature at the inlet to the fan 23.

The fan tip temperature rise is relatively low in the embodiment being described. In various embodiments, the fan 23 may be rotated at a relatively low speed at cruise to facilitate the low temperature rise. For example, the fan 23 may rotate at less than 2000 rpm, and/or may have a tip speed below Mn 1.1. The fan 23 of such embodiments may have a fan diameter equal to or greater than 230 cm. The skilled person would appreciate that, in various embodiments, a gearbox 30 may be provided to facilitate slower rotation of the fan 23, and that the engine cycle may be designed around these parameters.

The aerodynamic design of the fan 23 may be selected to facilitate obtaining relatively low temperature rises across the fan as described herein. For example, the fan 23 may be designed to have pressure ratios at cruise of:

Fan Tip Pressure Ratio: in the range of 1.2-1.45; optionally in the range of 1.35-1.44; and further optionally equal to 1.41;

Fan Root Pressure Ratio at cruise: in the range of 1.18-1.30, and optionally equal to 1.24; and/or Fan Pressure Ratio: in the range of 1.35-1.43, and optionally equal to 1.39.

The fan tip pressure ratio is defined as the mean total pressure of the flow at the fan exit that subsequently flows (as flow B) through the bypass duct 22 to the mean total pressure at the inlet to the fan 23. With reference to FIGS. 4A and 4B, the mean total pressure of the flow at the fan exit that subsequently flows through the bypass duct 22 is the mean total pressure over the surface that is immediately downstream of the fan 23 and radially outside the stream-surface 110.

The fan root pressure ratio is defined as the mean total pressure of the flow at the fan exit that subsequently flows (as flow A) through the engine core 11 to the mean total pressure at the inlet to the fan 23. With reference to FIGS. 4A and 4B, the mean total pressure of the flow at the fan exit that subsequently flows through the engine core is the mean total pressure of the flow that is immediately downstream of the fan 23 and radially inside the streamsurface 110. The mean total pressure at the inlet to the fan 23 is the mean total pressure over the surface that extends across the engine (for example from the hub 66 to the tip 68 of the fan blade 66) and is immediately upstream of the fan 23.

The fan pressure ratio is defined as the ratio of the mean total pressure of the air flow at the exit of the fan 23 to the mean total pressure of the air flow at the inlet of the fan 23.

The hub to tip ratio of the fan, defined as $R_{Hub}/R_{fan\ tip}$, may also be selected as part of aerodynamic design considerations for the fan 23—for the engine 10 being described, the hub to tip ratio of the fan 23 is in the range from 0.285 to 0.2, and optionally in the range from 0.24 to 0.27.

As mentioned above, the temperature across the trailing edge 64b of each blade 64 generally varies with radius—the average temperature of airflow B entering the bypass duct 22 is different from the average temperature of airflow A entering the engine core 11. A further temperature, T21, is therefore defined as the average temperature of airflow A entering the engine core 11, which corresponds to the average temperature across the radially inner portion of the trailing edge 64a of each fan blade 64 (the radially inner portion of each blade 64 being the remainder of the blade once the radially outer portion defined above is removed from consideration). T21 may be referred to as the inner fan rotor exit temperature or fan root exit temperature. T21 may be referred to as the core entry temperature, as it is the average temperature of airflow entering the engine core 11 at cruise conditions. As the temperature of the core airflow does not vary significantly between the trailing edge 64b of the fan blades 64 and the first stator/guide vane 24 within the core 11, T21 may be measured anywhere within that region as marked in FIG. 4B. For example, the core entry temperature (T21) may be measured at/defined as any or all of the following:

(i) the temperature of the core airflow at the axial position of the forwardmost point 70 of the core casing 11a (the splitter 70);

(ii) the temperature of the core airflow at the axial position of the leading edge of the forwardmost stator or rotor of the (forwardmost/lowest pressure) compressor 14; and/or (iii) the temperature of the airflow across the trailing edge 64b of a radially inner portion of each fan blade 64, the airflow across the radially inner portion of each fan blade 64 being arranged to provide the core airflow A.

The compressor exit temperature (T30) is defined as an average temperature of airflow at the exit from the compressor 15. T30 is defined at the axial position of the trailing edge of the rearmost rotor of the compressor 15. In the embodiment being described, combustion equipment 16 located between the exit from the compressor 15 and the entrance to the turbine 17 located downstream of the compressor 15 provides heat to the gas flow leaving the compressor 15, so increasing the temperature of flow into the turbine 17 from T30 to T40—the difference between T30 and T40 may be around 800 K, or more in some embodiments.

In the embodiment being described, the gas turbine engine comprises more than one compressor 14, 15, and more specifically comprises two compressors. In such embodiments, the compressor exit temperature T30 is defined at the exit from the highest pressure compressor 15.

A core temperature rise may be defined as:

$$\frac{\text{the compressor exit temperature } (T30)}{\text{the fan rotor entry temperature } (T120 \text{ or } T20)}.$$

The core temperature rise may therefore measure the change in core airflow A temperature caused by both the fan 23 and the compressor(s) 14, 15. The core temperature rise is defined as the temperature ratio across the core compression system; this may be thought of as a measure of core thermal efficiency. In the embodiments being described, the core temperature rise is in the range from 3.1 to 4.0, and optionally in the range from 3.3 to 3.5. The core temperature rise may be equal to 3.33.

A core to fan tip temperature rise ratio may be defined as:

$$\frac{\text{the core temperature rise}}{\text{the fan tip temperature rise}} = \frac{T30/T120}{T125/T120} = \frac{T30}{T125}$$

As the temperature of both the core flow A and the bypass flow B is the same at the leading edge 64a of the fan blades 64 (T20=T120), the same temperature value, T120, can be used for each flow A, B, so allowing T120 to cancel out as shown above.

The core to fan tip temperature rise ratio may be in the range from 2.845 to 3.8, and optionally in the range from 2.9 to 3.2. The core to fan tip temperature rise ratio may be equal to 3 in some embodiments. The core to fan tip temperature rise ratio is therefore relatively high by virtue of the relatively high core temperature rise and relatively low fan tip temperature rise. The engine cycle may be devised, and/or engine parameters selected, based on these parameters.

In the embodiment being described, a geared architecture and gearbox 30 are used to facilitate the lower fan tip temperature rise as described above. In addition, a compressor design is selected to provide a compressor 14, 15 with an aerodynamic design that is efficient at a high level of loading. In the embodiments being described, the compressor design comprises 13 or more stages of compression (including the fan 23 as the first stage) so as to provide the desired effects. The compressor design may comprise a maximum of 16 stages of compression (including the fan 23) in some such embodiments. Each stage may be defined as a rotor, or a rotor-stator pair. In the embodiment being described, with 13 stages of compression—the fan 23 provides the first stage, the low pressure compressor 14 provides the subsequent three stages, and the high pressure compressor 15 provides the final nine stages. In alternative embodiments, the total number of compression stages may vary, the number of compressors 14, 15 may vary, and/or the split between the one or more compressor(s) may vary.

In the embodiment being described the compressors 14, 15 are axial compressors. In various alternative embodiments, one or more of the compressors 14, 15 may be a centrifugal compressor.

A high pressure ratio across the compressor(s) and an efficient level of core compression may therefore be achieved.

The core to fan tip temperature rise ratio may be thought of as a relationship between the temperature rise across the core compression system (including the fan) and that across the bypass compression system at the cruise operating conditions (i.e. the mid-cruise operating point, which is an altitude of 10700 m (35,000 ft), or optionally more particularly of 10668 m, and a speed of 0.85 Mn in the embodiment being described.

A core compressor temperature rise may be defined as:

$$\frac{\text{the compressor exit temperature } (T30)}{\text{the core entry temperature } (T21)}$$

The core compressor temperature rise may be in the range from 2.9 to 4.0, and optionally in the range from 3.1 to 3.3. The core compressor temperature rise may be, for example, equal to 3.12.

A core compressor to fan tip temperature rise ratio may be defined as:

$$\frac{\text{the core compressor temperature rise}}{\text{the fan tip temperature rise}} = \frac{T30/T21}{T125/T120} = \frac{T120 \times T30}{T125 \times T21}$$

The core compressor to fan tip temperature rise ratio may be in the range from 2.67 to 3.8, and more specifically in the range from 2.67 to 3.7 or from 2.67 to 3.5. The core compressor to fan tip temperature rise ratio may be in the range from 2.80 to 2.95, and optionally may be equal to 2.81. The core compressor to fan temperature rise ratio may be relatively high, resulting from a relatively low fan tip temperature rise, and/or a relatively high core compressor temperature rise.

As compared to the core temperature rise, the core compressor temperature rise excludes the temperature rise across the fan root 69, and therefore only measures the heat imparted to the airflow A by the compressor(s) 14, 15.

In the embodiment being described, obtaining a relatively low fan tip temperature rise is facilitated by use of a geared architecture and a gearbox 30, allowing the fan 23 to rotate more slowly than other drivetrain components. The relatively high core compressor temperature rise may be provided by having a core compressor aerodynamic design that is efficient at a high level of loading, which typically can be achieved with 13 stages of compression or greater as discussed above.

The core compressor to fan tip temperature rise ratio may be thought of as a relationship between the temperature rise across the core compression system (excluding the fan) and that across the bypass compression system at the cruise operating condition.

The core compressor temperature rise is defined as the temperature ratio across the core compression system; this may be thought of as a measure of core compressor thermal efficiency, by which the core compressor pressure rise is achieved.

The skilled person would appreciate that one or more of the following engine features may be adjusted to obtain an engine 10 with a core compressor to fan tip temperature rise ratio within the specified range:

A large flow area fan design, with the fan 23 being arranged to rotate at a relatively slow speed (optionally facilitated by use of a gearbox 30) in order to achieve a low fan tip temperature rise; and/or A core compression system with high levels of efficiency and optimised loading that facilitate obtaining a high thermal efficiency.

A low temperature rise across the fan root 69 may facilitate the fan achieving a high propulsive efficiency while being operable and mechanically feasible.

A fan root temperature rise may be defined as:

$$\frac{\text{the core entry temperature } (T21)}{\text{the fan rotor entry temperature } (T120)}$$

The fan root temperature rise may be in the range from 1.03 to 1.09, and optionally in the range from 1.05 to 1.07. The fan root temperature rise may be, for example, equal to 1.07.

A core compressor to fan root temperature rise ratio may be defined using the fan root temperature rise and the core compressor temperature rise:

$$\frac{\text{the core compressor temperature rise}}{\text{the fan root temperature rise}} = \frac{T30/T21}{T21/T120} = \frac{T30 \times T120}{T21^2}$$

The core compressor to fan root temperature rise ratio may be in the range from 2.76 to 4.1, optionally in the range from 2.8 to 3.2, and may be, for example, equal to 2.9.

The engine 10 may have a geared architecture comprising a gearbox 30. The engine 10 may have a high pressure ratio and an efficient level of core compression, for example achieved by having a core compressor aerodynamic design that is efficient at a high level of loading which typically can be achieved with 13 stages of compression or greater, as discussed above.

The fan root 69 may be designed to have a low temperature rise and a low level of work to facilitate the operability of the fan and the obtaining of a high level of propulsive efficiency. The high level of propulsive efficiency may be provided by a relatively straight fan root 69, having a low level of curvature relative to the curvature of the fan tip. For example, the curvature of the fan root 69 may be less than 60% of the curvature of the fan tip. In the embodiment being described, the curvature of the root portion of the blade is between 40% and 60% less than the curvature across the tip portion of the blade, and optionally around 50% less. In alternative or additional embodiments, the curvature of the root portion may be less than that of the tip portion by an amount within a range having a lower bound of any of 5%, 10%, 20%, 30%, 40% and an upper bound of any of 40%, 50% or 60%. The listed percentages are percentages of the blade camber (i.e. difference between a line that is tangent to the camber line at the leading edge of the blade 68 and a line that is tangent to the camber line at the trailing edge of the blade 68). The skilled person would appreciate that the "root portion" of a fan blade is sometimes taken to mean the portion of a fan blade 64 within the hub 66 and used to connect the blade 64 to the hub 66; this is not the case as used herein—the root portion 69 refers to the radially inner portion of the blade as described elsewhere herein, extending from the hub 66 and across the entrance to the core 11.

The radially inner portion of the blade as defined herein may also be known as the "hub section" of the blade by the skilled person.

The Overall Pressure Ratio (OPR) of an engine 10 with a core compressor to fan root temperature rise ratio in the listed range may be greater than 40.

In various embodiments, the engine core 11 comprises:

a first, lower pressure, turbine 19 (sometimes referred to as the low pressure turbine, or LPT), a first compressor 14, and a first core shaft 26 connecting the first turbine 19 to the first compressor 14; and a second, higher pressure, turbine 17 (sometimes referred to as the high pressure turbine, or HPT), a second compressor 15, a second core shaft 27 connecting the second turbine 17 to the second compressor 15.

In such embodiments, a second turbine exit temperature (T42) may be defined as an average temperature of airflow at the exit from the second turbine 17 at cruise conditions and a first turbine exit temperature (T50) may be defined as an average temperature of airflow at the exit from the first turbine 19 at cruise conditions. T42 may be referred to as the high pressure turbine exit temperature. T50 may be referred to as the low pressure turbine exit temperature.

In embodiments wherein the engine 10 comprises more than two turbines 17, 19, and the highest pressure turbine 17 of the engine 10 may be selected as the second turbine 17 and the lowest pressure turbine 19 of the engine 10 may be selected as the first turbine 19.

Figure 5A:
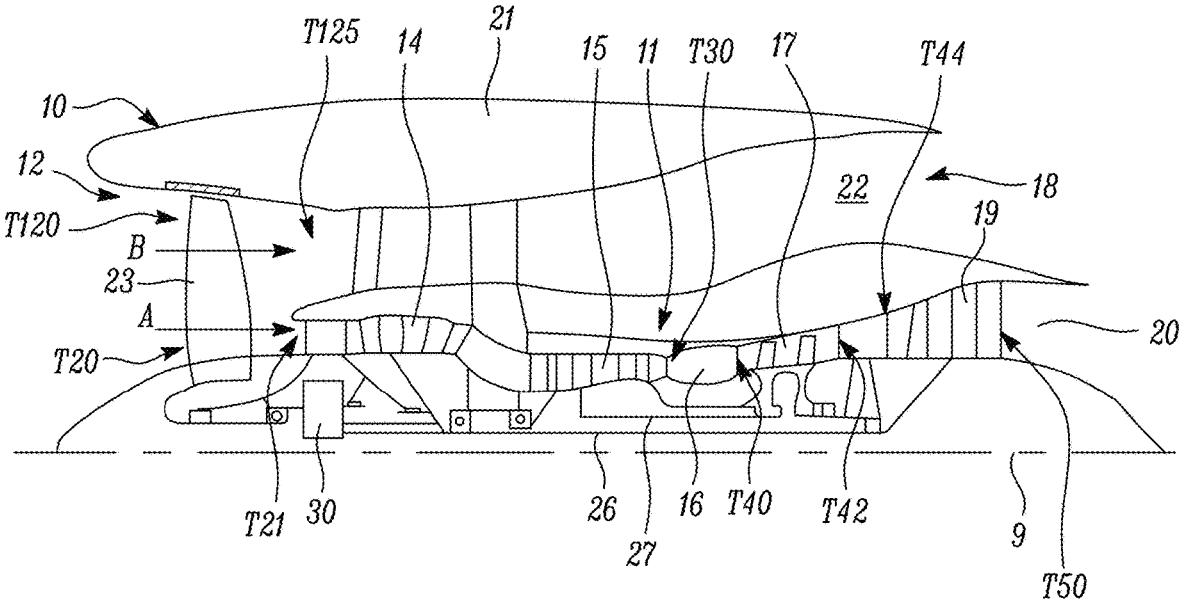
FIG. 5A is a sectional side view of the gas turbine engine shown in FIG. 1, with indications of where various temperatures are to be measured marked.

As shown in FIG. 5A, T42 may be measured at the position of the rearmost rotor of the second turbine 17 and T50 may be measured at the position of the rearmost rotor of the first turbine 19.

Figure 5B:
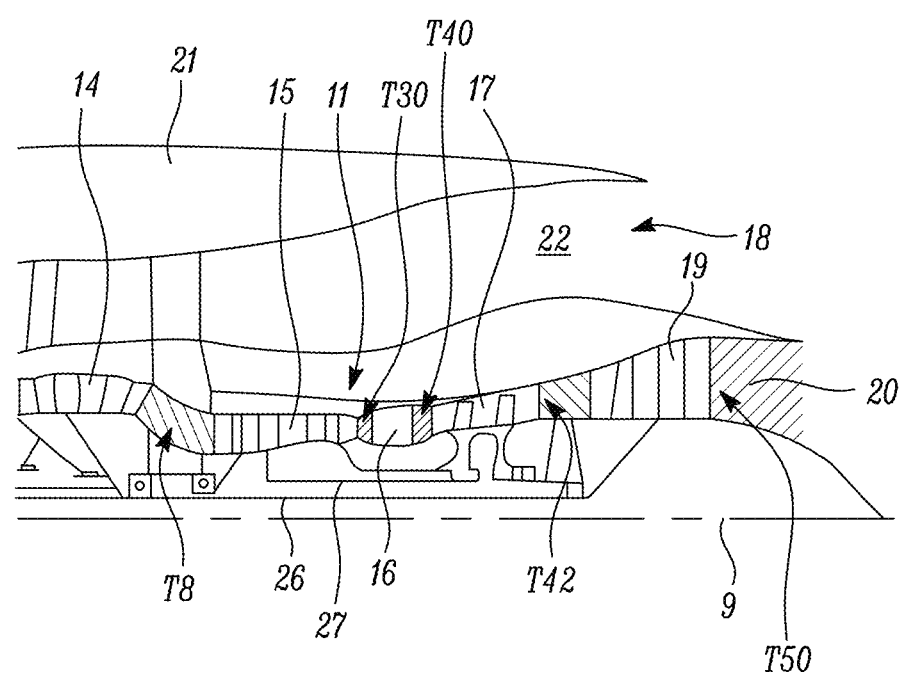
FIG. 5B is the sectional side view of FIG. 5A with regions within which the various temperatures may be measured marked.
Figure 6:
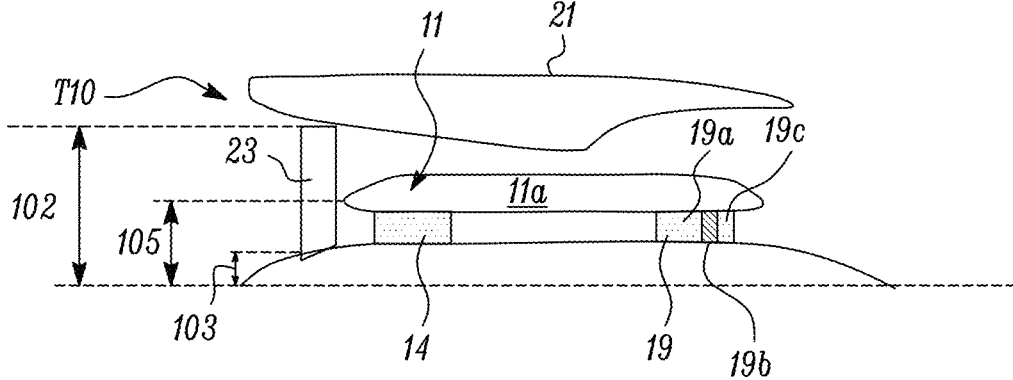
FIG. 6 is a schematic side view of a gas turbine engine.
Figure 7:
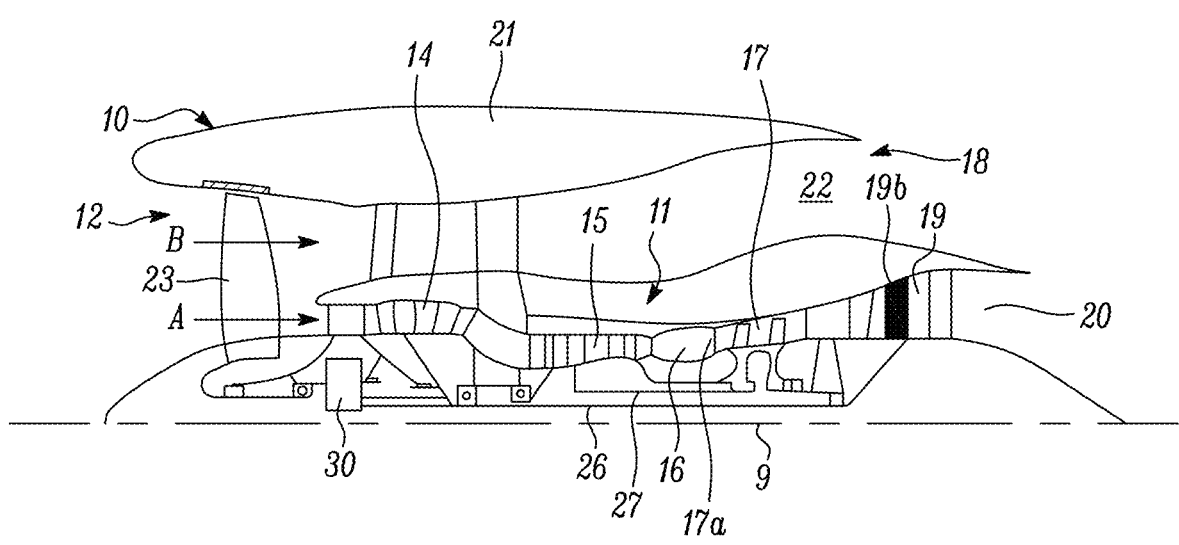
FIG. 7 is the schematic side view of a gas turbine engine as shown in FIG. 1, with turbine details highlighted.

In the embodiment being described, the first turbine 19 is located immediately downstream of the second turbine 17. The second turbine exit temperature T42 may therefore be measured anywhere between the second turbine 17 and the first turbine 19, and may also be similar or equivalent to an entrance temperature (T44) for the first, lower pressure, turbine 19. FIG. 5B illustrates the measurement region for T42. The skilled person would appreciate that there may be a change in temperature, for example of around 10-20 K, across this region, for example due to cooling air. However, this difference may be too small as to noticeably affect the claimed ratios.

In embodiments with more than two turbines 17, 19, the highest pressure turbine exit temperature T42 may not be similar or equivalent to the lowest pressure turbine entry temperature T44.

The low(est) pressure turbine 19 is located immediately upstream of a core exit nozzle in the embodiment being described. T50 may be measured at the position of the rearmost rotor of the first turbine 19, or anywhere within the core exit nozzle. The skilled person would appreciate that core gas stream temperature will gradually equilibrate with the surrounding atmosphere as it leaves/once it has left the engine 10. FIG. 5B illustrates the measurement region for T50.

A low pressure turbine temperature change may be defined as:

$$\frac{\text{the second turbine exit temperature } (T42)}{\text{the first turbine exit temperature } (T50)}.$$

The low pressure turbine 19 temperature change may alternatively be defined as follows, noting that the first turbine entrance temperature T44 is generally comparable to the second turbine exit temperature T42:

$$\frac{\text{the first turbine entrance temperature } (T44)}{\text{the first turbine exit temperature } (T50)}$$

The skilled person would appreciate that temperature falls across a turbine in use, such that the entrance temperature (T42) to the first (low pressure) turbine 19 is higher than the exit temperature (T50) from the first turbine 19. The temperature change may therefore be described as a temperature fall or temperature drop.

In embodiments with more than two turbines 17, 19, the low pressure turbine (LPT) temperature change may instead be called the lowest pressure turbine temperature change-providing a measure of the temperature change over just the lowest pressure turbine.

The low pressure turbine temperature change therefore provides a measure of the average temperature change between the leading edge of the LPT 19 nozzle guide vane 19a (the stator of the forward-most rotor-stator pair of the LPT 19) and the trailing edge of the final rotor stage 19c of the LPT 19, as indicated in FIG. 5A.

The low pressure turbine temperature change (T42/T50) may be in the range from 1.6 to 1.85, and optionally in the range from 1.65 to 1.8. The low pressure turbine temperature change may be, for example, equal to 1.68.

A turbine to fan tip temperature change ratio may be defined as shown below, using the fan tip temperature rise as defined above:

$$\frac{\text{the low pressure turbine temperature change}}{\text{the fan tip temperature rise}}$$

The turbine to fan tip temperature change ratio may be higher than in known engines, for example being in the range from 1.46 to 2.0 and optionally from 1.46 to 1.66. The turbine to fan tip temperature change ratio may be below 2.00, and optionally in the range from 1.5 to 1.8 in some embodiments.

In engines 10 of various embodiments with this temperature relationship, one or more of the following features may be present:

A gearbox that allows the LPT 19 to operate at a higher speed, for example having a maximum operating speed between 4500 and 8000 rpm, e.g. for a fan 23 with a fan diameter in the range from 330 cm to 380 cm or alternatively example having a maximum operating speed between 7000 and 12000 rpm, e.g. for a fan 23 with a fan diameter in the range from 240 cm to 280 cm;

The skilled person would appreciate that, in embodiments with a gearbox 30, LPT speed is generally equal to the fan speed multiplied by the gear ratio of the gearbox 30.

A LPT 19 with favourable stage loading, for example having three or more rotor stages;

An efficient aerodynamic fan design, for example having relatively low fan root curvature as compared to fan tip curvature (as described in more detail elsewhere herein);

A fan 23 arranged to rotate at a relatively slow speed at cruise, optionally enabled by a gearbox 30;

The rotational speed of the fan at cruise conditions may be, for example, less than 2500 rpm, or less than 2300 rpm.

For an engine having a fan diameter in the range of from 220 cm to 300 cm (for example 240 cm to 280 cm or 250 cm to 270 cm), the fan speed may be in the range of from 1700 rpm to 2500 rpm, for example in the range of from 1800 rpm to 2300 rpm, for example in the range of from 1900 rpm to 2100 rpm.

For an engine having a fan diameter in the range of from 330 cm to 380 cm, the fan speed may be in the range of from 1200 rpm to 2000 rpm, for example in the range of from 1300 rpm to 1800 rpm, for example in the range of from 1400 rpm to 1800 rpm.

and/or

An engine designed to be low specific thrust, high bypass ratio and to have a low fan pressure ratio (the ratio of the mean total pressure of the air flow at the exit of the fan 23 to the mean total pressure of the air flow at the inlet of the fan 23, at cruise conditions).

"Low specific thrust" may mean, in various embodiments, a thrust at cruise conditions in the range of 60 to 100 $Nkg^{-1}$ s, and optionally in the range of 70-90 $Nkg^{-1}$ s. For example, the thrust at cruise may be equal to or below 90 $Nkg^{-1}$ s, and optionally equal to or below 88 or 85 $Nkg^{-1}$ s.

"High bypass ratio" may mean, in various embodiments, a bypass ratio at cruise conditions in the range of, for example, 12.5 to 30;

"Low fan pressure ratio" may mean, in various embodiments, a fan pressure ratio at cruise conditions in the range of 1.2 to 1.45; and optionally in the range 1.35 to 1.43. Further optionally, the fan pressure ratio at cruise may be in the range 1.37 to 1.41 or 1.38 to 1.40. For example, the fan pressure ratio at cruise may be equal to 1.39. In alternative or additional embodiments, the fan pressure ratio at cruise may be equal to or around 1.35, 1.36, 1.37, 1.38, 1.39, 1.40, 1.41, 1.42 or 1.43, and may for example be in the range from 1.39 to 1.43, from 1.35 to 1.40, and/or from 1.37 to 1.40.

To facilitate the operation of the lower pressure turbine (LPT) 19 so as to provide a larger temperature change (a higher magnitude drop in temperature across the lower pressure turbine 19), a gearbox 30 may be provided to allow the LPT 19 to operate at a favourable, higher, speed.

The LPT 19 may be designed to provide a favourable stage loading for the larger temperature change. Although dependent on engine thrust, such a design may typically be achieved with a LPT with three or more rotor stages, and optionally with four or more rotor stages.

In an engine core 11 comprising a second, higher pressure, turbine 17, a second compressor 15, a second, core shaft 27 connecting the second turbine 17 to the second compressor 15, and a first, lower pressure, turbine 19, a first compressor 14, and a first core shaft 26 connecting the first turbine 19 to the first compressor 14, a second turbine entrance temperature (T40) may be defined as an average temperature of airflow at the entrance to the second turbine 17 at cruise conditions. T40 may be measured/defined at the upstream (leading) edge of an inlet nozzle guide vane 17a of the high pressure turbine 17, as shown in FIG. 5A. An inlet nozzle guide vane 17a may be thought of as the forward-most stator of the high pressure turbine 17. In the embodiment being described, the gas stream temperature increases between the outlet of the compressor 15 and the inlet of the turbine 17 due to the combustor equipment 16; T40 may therefore be measured, or determined for a point, anywhere between the exit from the combustor equipment 16 and the entrance to the second turbine 17, as marked in FIG. 5B, and may more specifically be measured or otherwise determined at a leading edge of the most upstream stator 17a of the second turbine 17.

A high(est) pressure turbine temperature change may be defined as:

$$\frac{\text{the second turbine entrance temperature } (T40)}{\text{the second turbine exit temperature } (T42)}.$$

The high pressure turbine (HPT) temperature change may therefore be defined as the average temperature change between upstream of the HPT 17 inlet nozzle guide vane 17a (the forward most stator of the HPT 17) and after the final rotor stage of the HPT 17 as indicated in FIG. 5A.

In embodiments with more than two turbines 17, 19, the high pressure turbine temperature change may instead be referred to as the high pressure turbines temperature change and may be a measure of the temperature change across all turbines excluding the lowest pressure turbine 19. If the second turbine 17 is the highest pressure turbine, the second turbine exit temperature T42 may therefore be replaced with the lowest-but-one pressure turbine exit temperature in the calculation of the ratio, which may be at least substantially equal to the lowest pressure turbine entry temperature T44. T44 may not be similar to or equal to T42 in such embodiments. The high pressure turbine temperature change may be in the range from 1.40 to 1.55, and optionally in the range from 1.44 to 1.52. The high pressure turbine temperature change may be equal to 1.5, for example being 1.50 or 1.51.

A low to high pressure turbine temperature change ratio may then be defined as below, noting that T42 is generally at least similar to T44 (e.g. within 10-20 K):

$$\frac{\text{the low pressure turbine temperature change}}{\text{the high pressure turbine temperature change}} =$$

$$\frac{T44/T50}{T40/T42} = \frac{T42 \times T44}{T50 \times T40} \approx \frac{T42^2}{T50 \times T40}$$

The low to high pressure turbine temperature change ratio, which may also be referred to as a temperature fall ratio, may be in the range from 1.09 to 1.30, and optionally in the range from 1.10 to 1.25.

The low to high pressure turbine temperature change ratio provides a relationship between the temperature change across the low pressure turbine 19 and the temperature change across the high pressure turbine 17 at the cruise operating conditions.

To reduce fuel burn, and optionally reduce or minimise core size, and/or maximise thermal efficiency across the high pressure turbine, the inventors appreciated that a relatively low temperature change across the higher pressure turbine (HPT) 17 (as compared to the temperature change across the lower pressure turbine 19) may be beneficial.

In various embodiments, this relatively low HPT temperature change may be obtained by using an HPT 17 with an efficient design, for example having two rotor stages, or only a single rotor stage.

In the embodiments being described, the first turbine 19 is arranged to receive airflow from the exit of the second turbine 17, such that the first turbine entrance temperature (T42) is generally similar to the second turbine exit temperature (T42), sometimes with a 10 to 20 K difference due to the introduction of cooling air.

In the embodiments being described, the second turbine 17 is arranged to receive airflow from the exit of the (high pressure) compressor 15; this airflow passes via the combustion equipment 16 between the compressor and the turbine, such that T30 (the second turbine entrance temperature) is higher than the compressor exit temperature T40.

In engines 10 of various embodiments with this temperature relationship, one or more of the following features may be present:

A gearbox arranged to allow the LPT 19 to operate at a favourable, higher, speed;

A LPT 19 with optimal stage loading, for example having three or more rotor stages 19a, 19b, 19c;

A high pressure compressor 15 with an aerodynamic design and a low level of loading, for example having nine or more rotor stages;

An efficient HPT 17, for example having two rotor stages or fewer.

Figure 8:
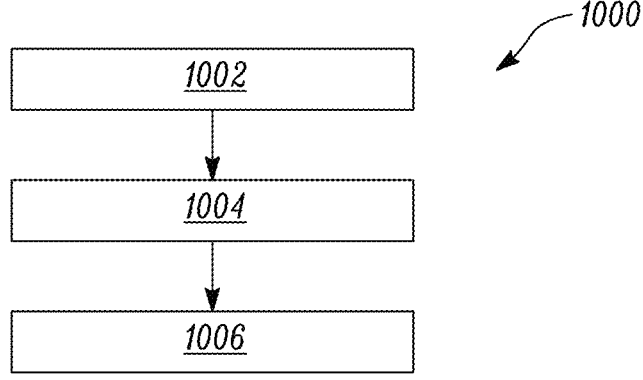
FIG. 8 illustrates a method.
Figure 9:
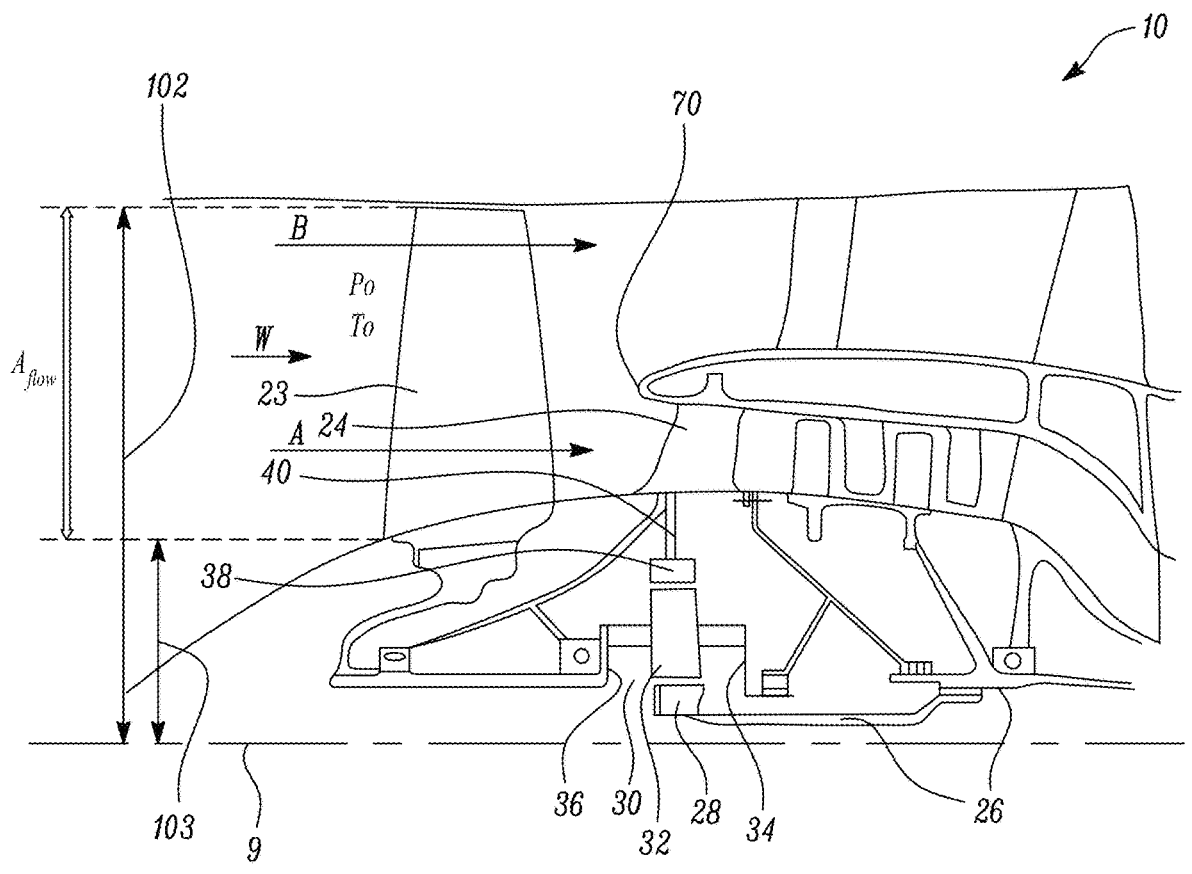
FIG. 9 is a close up sectional side view of an upstream portion of the gas turbine engine shown in FIG. 2, with indications of flows and areas marked.

The present disclosure also relates to methods 1000 of operating a gas turbine engine 10 on an aircraft 50. The methods 1000 are illustrated in FIG. 8. The method 1000 comprises starting up 1002 the engine 10 (e.g. prior to taxiing on a runway), and operating 1004 the engine during taxiing, take-off, and climb of the aircraft 50, as suitable, so as to reach cruise conditions. Once cruise conditions have been reached, the method 1000 then comprises operating 1006 the gas turbine engine 10 described in embodiments elsewhere herein to provide propulsion under cruise conditions.

The gas turbine engine 10 is operated such that any one or more of the parameters or ratios defined herein are within the specified ranges. For example, the method comprises operating 1006 the gas turbine engine 10 such that any one or more of:

a) the fan hub to tip ratio of:

$$\frac{\text{the fan hub radius (103)}}{\text{the fan tip radius (102)}}$$

is in the range from 0.2 to 0.285; and
the fan tip temperature rise of:

$$\frac{\text{the fan tip rotor exit temperature } (T125) \text{ in Kelvin}}{\text{the fan rotor entry temperature } (T120) \text{ in Kelvin}}$$

is in the range from 1.11 to 1.05;
b) the core to fan temperature rise ratio of:

$$\frac{\text{the core temperature rise}}{\text{the fan tip temperature rise}}$$

is in the range from 2.845 to 3.8;
c) the core compressor to fan tip temperature rise ratio of:

$$\frac{\text{the core compressor temperature rise}}{\text{the fan tip temperature rise}}$$

is in the range from 2.67 to 3.8, and optionally 2.67 to 3.7;

d) the core compressor to fan root temperature rise ratio of:

$$\frac{\text{the core compressor temperature rise}}{\text{the fan root temperature rise}}$$

is in the range from 2.76 to 4.1;
e) the turbine to fan tip temperature change ratio of:

$$\frac{\text{the low pressure turbine temperature change}}{\text{the fan tip temperature rise}}$$

is in the range from 1.46 to 2.0; and/or
f) a low to high pressure turbine temperature change ratio of:

$$\frac{\text{the low pressure turbine temperature change}}{\text{the high pressure turbine temperature change}}$$

is in the range from 1.09 to 1.30, and optionally from 1.10 to 1.25.

Figure 10:
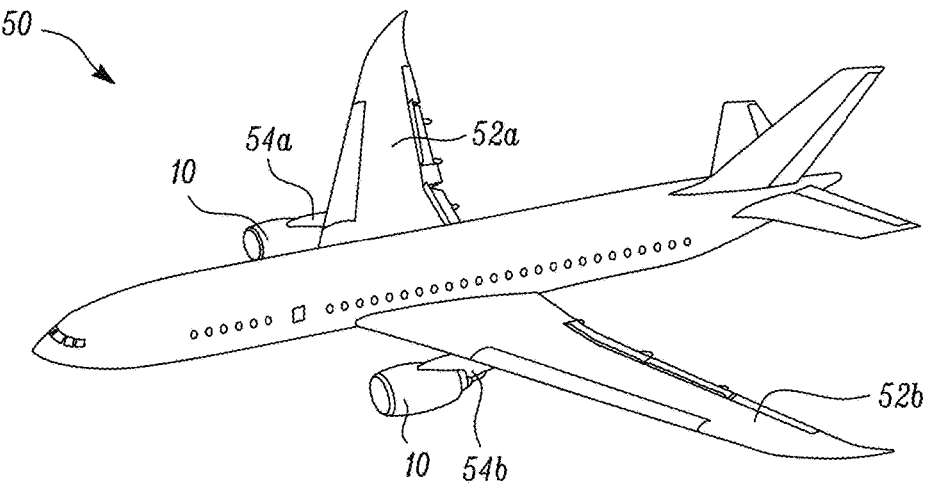
FIG. 10 is a perspective view of an aircraft with two gas turbine engines mounted thereon.

FIG. 10 illustrates an example aircraft 50 having a gas turbine engine 10 attached to each wing 52a, 52b thereof. Each gas turbine engine 10 is attached via a respective pylon 54a, 54b. When the aircraft 50 is flying under cruise conditions, as defined herein, each gas turbine engine 10 operates according to the parameters defined herein. For example, the gas turbine engines 10 operate such that any one or more of the conditions (a) to (f) defined for the method 1000 above are obtained.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A gas turbine engine for an aircraft comprising:

an engine core comprising a turbine, a compressor, and a core shaft connecting the turbine to the compressor, wherein a compressor exit temperature is defined as an average temperature of airflow at the exit from the compressor at cruise conditions and a core entry temperature is defined as an average temperature of airflow entering the engine core at the cruise conditions, and a core compressor temperature rise is defined as:

$$\frac{\text{compressor exit temperature}}{\text{core entry temperature}};$$

and a fan located upstream of the engine core, the fan comprising a plurality of fan blades extending from a hub, each fan blade having a leading edge and a trailing edge, wherein a fan rotor entry temperature is defined as an average temperature of airflow across the leading edge of each fan blade at the cruise conditions, and a fan root temperature rise is defined as:

$$\frac{\text{core entry temperature}}{\text{fan rotor entry temperature}},$$

and wherein a product of a core compressor to fan root temperature rise ratio and a bypass ratio at the cruise conditions of:

$$\frac{\text{core compressor temperature rise}}{\text{fan root temperature rise}} \times \text{bypass ratio}$$

is in the range from 33.12 to 51.25, wherein the bypass ratio at the cruise conditions is in the range of from 12 to 15, and wherein the cruise conditions means the conditions at mid-cruise of the aircraft to which the gas turbine engine is attached, and the cruise conditions at mid-cruise means the conditions experienced by the aircraft and the gas turbine engine at a point between top of climb and start of descent at which 50% of the total fuel that is burned between the top of climb and the start of descent has been burned.

2. The gas turbine engine according to claim 1, wherein the product of the core compressor to fan root temperature rise ratio and the bypass ratio at the cruise conditions is in the range of from 34.50 to 51.25 and the bypass ratio at the cruise conditions is in the range of from 12.5 to 15.

3. The gas turbine engine according to claim 1, wherein the product of the core compressor to fan root temperature rise ratio and the bypass ratio at the cruise conditions is in the range of from 33.12 to 49.20.

4. The gas turbine engine according to claim 3, wherein the bypass ratio at the cruise conditions is in the range of from 12 to 14.

5. The gas turbine engine according to claim 4, wherein the product of the core compressor to fan root temperature rise ratio and the bypass ratio at the cruise conditions is in the range of from 33.12 to 44.80.

6. The gas turbine engine according to claim 1, wherein the product of the core compressor to fan root temperature rise ratio and the bypass ratio at the cruise conditions is in the range of from 33.12 to 41.60 and the bypass ratio at the cruise conditions is in the range of from 12 to 13.

7. The gas turbine engine according to claim 6, wherein the core compressor to fan root temperature rise ratio is in the range of from 2.76 to 3.2.

8. The gas turbine of claim 7, wherein the fan has a fan diameter in the range of from 330 cm to 380 cm and a fan rotational speed at the cruise conditions in the range of from 1200 rpm to 2000 rpm.

9. The gas turbine of claim 8, wherein the fan rotational speed at the cruise conditions is in the range of from 1300 rpm to 1800 rpm.

10. The gas turbine engine according to claim 1, wherein the product of the core compressor to fan root temperature rise ratio and the bypass ratio at the cruise conditions is in the range of from 38.40 to 51.25 and the core compressor to fan root temperature rise ratio is in the range of from 3.20 to 4.10.

11. The gas turbine engine according to claim 10, wherein the bypass ratio at the cruise conditions is in the range of from 12 to 12.5.

12. The gas turbine engine according to claim 1, wherein the fan has a fan diameter in the range of from 220 cm to 300 cm and a fan rotational speed at the cruise conditions in the range of from 1700 rpm to 2500 rpm.

13. The gas turbine of claim 1, further comprising a gearbox that receives an input from the core shaft and outputs drive to the fan so as to drive the fan at a lower rotational speed than the core shaft.

14. The gas turbine of claim 13, wherein the gearbox has a gear ratio in the range of from 3.2 to 5.

15. The gas turbine engine of claim 14, wherein the curvature of a root portion of the fan blade is between 10% and 60% less than the curvature of a tip portion of the fan blade.

16. The gas turbine engine according to claim 14, wherein the fan has a fan tip loading in the range of from 0.29 to 0.32, or in the range of from 0.30 to 0.32.

17. The gas turbine engine of claim 16, wherein the curvature of a root portion of the fan blade is between 40% and 60% less than the curvature of a tip portion of the fan blade and an overall pressure ratio is in the range of from 40 to 45.

18. The gas turbine of claim 13, wherein the gearbox has a gear ratio in the range of from 3.2 to 4, and the product of the core compressor to fan root temperature rise ratio and the bypass ratio at the cruise conditions is in the range of from 33.12 to 49.20.

19. The gas turbine engine of claim 18, wherein the bypass ratio is in the range of from 12 to 14.5.

20. The gas turbine engine of claim 18, wherein an overall pressure ratio is in the range of from 45 to 60 at the cruise conditions.

\* \* \* \* \*